US012647876B2

(12) United States Patent
Bergström et al.

(10) Patent No.: US 12,647,876 B2
(45) Date of Patent: Jun. 2, 2026

(54) REPORTING OF SYSTEM INFORMATION (SI) HASH VALUES

(71) Applicant: Telefonaktiebolaget LM Ericsson (publ), Stockholm (SE)

(72) Inventors: Mattias Bergström, Sollentuna (SE); Oscar Ohlsson, Bromma (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 292 days.

(21) Appl. No.: 18/549,247

(22) PCT Filed: Mar. 10, 2022

(86) PCT No.: PCT/SE2022/050237
§ 371 (c)(1),
(2) Date: Sep. 6, 2023

(87) PCT Pub. No.: WO2022/220714
PCT Pub. Date: Oct. 20, 2022

(65) Prior Publication Data
US 2024/0306076 A1     Sep. 12, 2024

Related U.S. Application Data

(60) Provisional application No. 63/173,558, filed on Apr. 12, 2021.

(51) Int. Cl.
*H04W 48/10*          (2009.01)
*H04W 24/10*          (2009.01)

(52) U.S. Cl.
CPC ........... *H04W 48/10* (2013.01); *H04W 24/10* (2013.01)

(58) Field of Classification Search
CPC .............................. H04W 48/10; H04W 24/10
USPC ......................................................... 455/434
See application file for complete search history.

(56) References Cited

U.S. PATENT DOCUMENTS

2019/0254105 A1*  8/2019  Kim ....................... H04W 76/27
2021/0377916 A1*  12/2021  Shi ......................... H04W 24/02

OTHER PUBLICATIONS

"3GPP TR 33.809 V0.10.0 (S3-202150)", 3rd Generation Partnership Project; Technical Specification Group Services and System Aspects Study on 5G Security Enhancement against False Base Stations (Release 17 ), Aug. 2020, pp. 1-88.
(Continued)

*Primary Examiner* — Qutbuddin Ghulamali
(74) *Attorney, Agent, or Firm* — Murphy, Bilak & Homiller, PLLC

(57) ABSTRACT

Embodiments include methods for a user equipment (UE) operating in a wireless network. Such methods include, while operating in a non-connected state in the wireless network, obtaining system information (SI) broadcast in each of a plurality of cells visited by the UE and, for each of the visited cells, determining one or more SI hash values for the SI broadcast in the visited cell. Such methods also include sending, to a network node in the wireless network, at least a portion of the determined SI hash values as mobility history information (MHI). Other embodiments include complementary methods for a network node, as well as UEs and network nodes configured to perform such methods.

17 Claims, 9 Drawing Sheets

(56)  References Cited

OTHER PUBLICATIONS

"3GPP TS 23.501 V17.0.0", 3rd Generation Partnership Project; Technical Specification Group Services and System Aspects; System architecture for the 5G System (5GS); Stage 2 (Release 17), Mar. 2021, pp. 1-489.
"3GPP TS 37.320 V16.4.0", 3rd Generation Partnership Project; Technical Specification Group Radio Access Network; Universal Terrestrial Radio Access (UTRA), Evolved Universal Terrestrial Radio Access (E-UTRA) and Next Generation Radio Access; Stage 2 (Release 16), Mar. 2021, pp. 1-35.
"3GPP TS 38.304 V16.4.0", 3rd Generation Partnership Project; Technical Specification Group Radio Access Network; NR; User Equipment (UE) procedures in Idle mode and RRC Inactive state Release 16), Mar. 2021, pp. 1-39.
"3GPP TS 38.331 V16.4.0", 3rd Generation Partnership Project; Technical Specification Group Radio Access Network; NR; Radio Resource Control (RRC) protocol specification (Release 16), Mar. 2021, pp. 1-949.

"3GPP TS 36.331 V16.4.0", 3rd Generation Partnership Project; Technical Specification Group Radio Access Network; Evolved Universal Terrestrial Radio Access (E-UTRA); Radio Resource Control (RRC); Protocol specification (Release 16), Mar. 2021, pp. 1-1087.
"Reply LS on False Base Station Detection", 3GPP TSG RAN WG2#113bis-e, R2-2102669, e-Meeting, Apr. 12-20, 2021, pp. 1-2.
"3GPP TS 38.331 V16.4.1", 3rd Generation Partnership Project; Technical Specification Group Radio Access Network; NR; Radio Resource Control (RRC) protocol specification (Release 16), Mar. 2021, pp. 1-949.
"3GPP TR 36.805 V9.0.0", 3rd Generation Partnership Project; Technical Specification Group Radio Access Network; Study on Minimization of drive-tests in Next Generation Networks; (Release 9), Dec. 2009, pp. 1-24.
"3GPP TS 33.401 V16.2.0", 3rd Generation Partnership Project; Technical Specification Group Services and System Aspects; 3GPP System Architecture Evolution (SAE); Security architecture (Release 16), Mar. 2020, pp. 1-167.

* cited by examiner

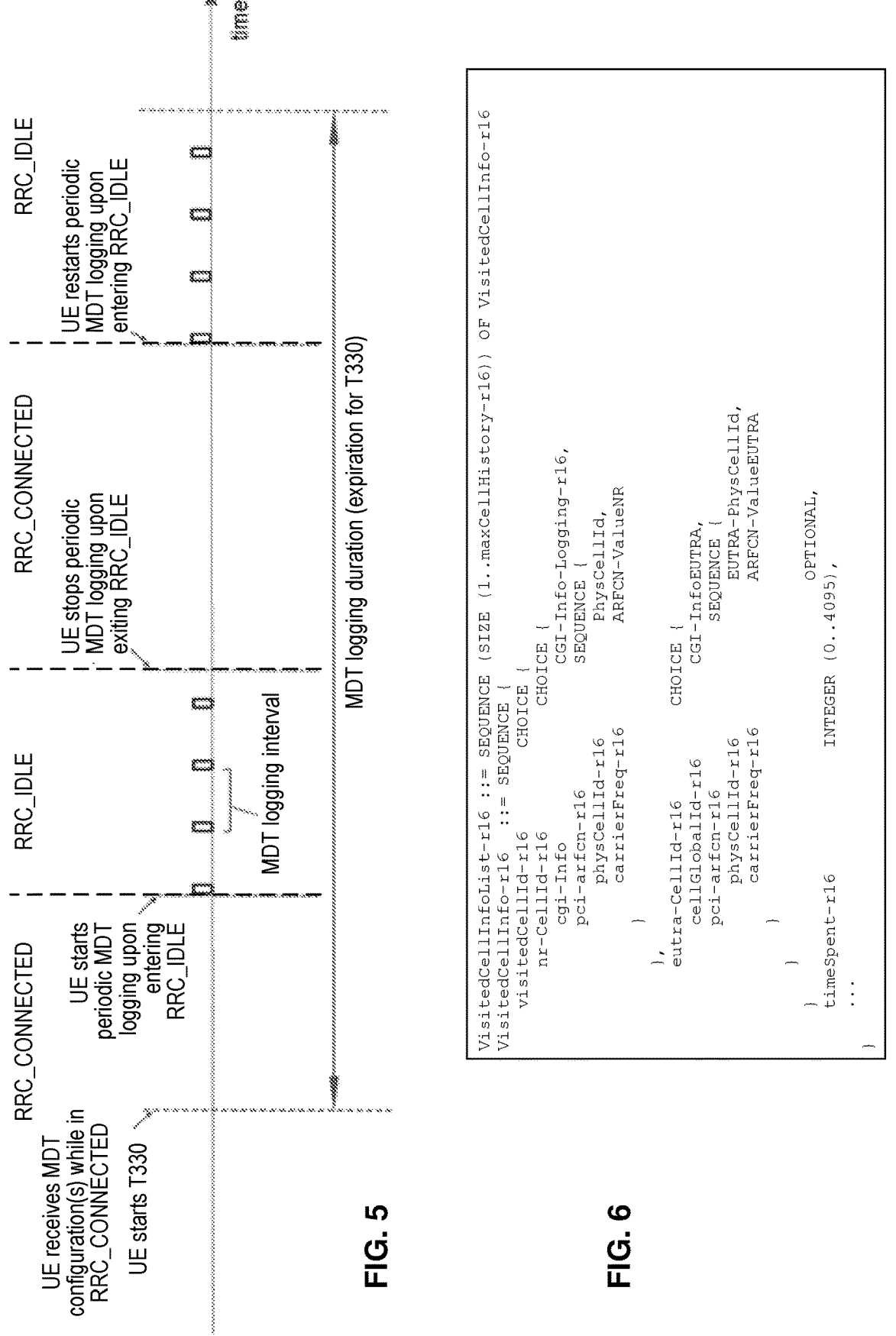

```
VisitedCellInfoList-r16 ::= SEQUENCE (SIZE (1..maxCellHistory-r16)) OF VisitedCellInfo-r16
VisitedCellInfo-r16 ::= SEQUENCE {
    visitedCellId-r16        CHOICE {
        nr-CellId-r16            CHOICE {
            cgi-Info                 CGI-Info-Logging-r16,
            pci-arfcn-r16            SEQUENCE {
                physCellId-r16           PhysCellId,
                carrierFreq-r16          ARFCN-ValueNR
            }
        },
        eutra-CellId-r16         CHOICE {
            cellGlobalId-r16         CGI-InfoEUTRA,
            pci-arfcn-r16            SEQUENCE {
                physCellId-r16           EUTRA-PhysCellId,
                carrierFreq-r16          ARFCN-ValueEUTRA
            }
        }
    },
    timeSpent-r16            INTEGER (0..4095),            OPTIONAL,
    ...
}
```

```
UEInformationResponse-r16 ::=            SEQUENCE {
    rrc-TransactionIdentifier                 RRC-TransactionIdentifier,
    criticalExtensions                        CHOICE {
        ueInformationResponse-r16                 UEInformationResponse-r16-IEs,
        criticalExtensionsFuture                  SEQUENCE {}
    }
}
UEInformationResponse-r16-IEs ::= SEQUENCE {
    measResultIdleEUTRA-r16             MeasResultIdleEUTRA-r16          OPTIONAL,
    measResultIdleNR-r16               MeasResultIdleNR-r16            OPTIONAL,
    logMeasReport-r16                  LogMeasReport-r16              OPTIONAL,
    connEstFailReport-r16              ConnEstFailReport-r16          OPTIONAL,
    ra-ReportList-r16                  RA-ReportList-r16              OPTIONAL,
    rlf-Report-r16                     RLF-Report-r16                OPTIONAL,
    mobilityHistoryReport-r16          MobilityHistoryReport-r16      OPTIONAL,
    lateNonCriticalExtension           OCTET STRING                  OPTIONAL,
    nonCriticalExtension               SEQUENCE {}                   OPTIONAL
}
...
MobilityHistoryReport-r16 ::= VisitedCellInfoList-r16
...
}
```

FIG. 7

```
VisitedCellInfoList-r16 ::= SEQUENCE (SIZE (1..maxCellHistory-r16)) OF
                               VisitedCellInfo-r16
VisitedCellInfo-r16   ::= SEQUENCE {
    visitedCellId-r16          CHOICE {
        nr-CellId-r16              CHOICE {
            cgi-Info                   CGI-Info-Logging-r16,
            pci-arfcn-r16              SEQUENCE {
                physCellId-r16             PhysCellId,
                carrierFreq-r16            ARFCN-ValueNR
            }
        },
        eutra-CellId-r16          CHOICE {
            cellGlobalId-r16          CGI-InfoEUTRA,
            pci-arfcn-r16             SEQUENCE {
                physCellId-r16             EUTRA-PhysCellId,
                carrierFreq-r16            ARFCN-ValueEUTRA
            }
        }
    }                                             OPTIONAL,
    timeSpent-r16             INTEGER (0..4095),
    ...,
    hash-InformationList-r17  HASH-InformationList-r17      OPTIONAL }
HASH-InformationList-r17 ::= SEQUENCE (SIZE (1..maxSIB)) OF HASH-Information-r17
HASH-Information-r17     ::= SEQUENCE {
    sib-Or-MIB-Number-r17       INTEGER (0..maxSIB)
    hash-OfSIB-r17              BIT STRING (SIZE (128))
}
```

FIG. 8

```
VisitedCellInfoList-r16  ::= SEQUENCE (SIZE (1..maxCellHistory-r16)) OF
                                        VisitedCellInfo-r16
VisitedCellInfo-r16      ::= SEQUENCE {
    visitedCellId-r16           CHOICE {
        nr-CellId-r16               CHOICE {
            cgi-Info                    CGI-Info-Logging-r16,
            pci-arfcn-r16               SEQUENCE {
                physCellId-r16              PhysCellId,
                carrierFreq-r16             ARFCN-ValueNR
            }
        },
        eutra-CellId-r16            CHOICE {
            cellGlobalId-r16            CGI-InfoEUTRA,
            pci-arfcn-r16              SEQUENCE {
                physCellId-r16              EUTRA-PhysCellId,
                carrierFreq-r16             ARFCN-ValueEUTRA
            }
        }
    }                                                           OPTIONAL,
    timeSpent-r16           INTEGER (0..4095),
    ...,
    hash                    BIT STRING (SIZE (128)),
    si-included-in-hash     BIT STRING (33)
}
```

FIG. 9

```
-- ASN1START
-- TAG-UEINFORMATIONREQUEST-START
UEInformationRequest-r16 ::=      SEQUENCE {
    rrc-TransactionIdentifier       RRC-TransactionIdentifier,
    criticalExtensions              CHOICE {
        ueInformationRequest-r16        UEInformationRequest-r16-IEs,
        criticalExtensionsFuture        SEQUENCE {}
    }
}
UEInformationRequest-r16-IEs ::= SEQUENCE {
    idleModeMeasurementReq-r16      ENUMERATED{true}        OPTIONAL, -- Need N
    logMeasReportReq-r16            ENUMERATED {true}       OPTIONAL, -- Need N
    connEstFailReportReq-r16        ENUMERATED {true}       OPTIONAL, -- Need N
    ra-ReportReq-r16                ENUMERATED {true}       OPTIONAL, -- Need N
    rlf-ReportReq-r16               ENUMERATED {true}       OPTIONAL, -- Need N
    mobilityHistoryReportReq-r16    ENUMERATED {true}       OPTIONAL, -- Need N
    lateNonCriticalExtension        OCTET STRING            OPTIONAL,
    nonCriticalExtension            UEInformationRequest-r17-IEs      OPTIONAL
}
UEInformationRequest-r17-IEs ::= SEQUENCE {
    systemInformationHASH-Req-r17   ENUMERATED{true}        OPTIONAL, -- Need N
    lateNonCriticalExtension        OCTET STRING            OPTIONAL,
    nonCriticalExtension            SEQUENCE {}             OPTIONAL
}
-- TAG-UEINFORMATIONREQUEST-STOP
-- ASN1STOP
```

FIG. 10

```
RRCResumeComplete-v1610-IEs ::= SEQUENCE {
    idleMeasAvailable-r16            ENUMERATED {true}            OPTIONAL,
    measResultIdleEUTRA-r16          MeasResultIdleEUTRA-r16      OPTIONAL,
    measResultIdleNR-r16             MeasResultIdleNR-r16         OPTIONAL,
    scg-Response-r16                 CHOICE {
        nr-SCG-Response                  OCTET STRING (CONTAINING RRCReconfigurationComplete),
        eutra-SCG-Response               OCTET STRING
    }                                                             OPTIONAL,
    ue-MeasurementsAvailable-r16     UE-MeasurementsAvailable-r16              OPTIONAL,
    mobilityHistoryAvail-r16         ENUMERATED {true}                         OPTIONAL,
    mobilityState-r16                ENUMERATED {normal, medium, high, spare}  OPTIONAL,
    needForGapsInfoNR-r16            NeedForGapsInfoNR-r16                     OPTIONAL,
    nonCriticalExtension             RRCResumeComplete-v1640-IEs               OPTIONAL
}

RRCResumeComplete-v1640-IEs ::=                  SEQUENCE {
    uplinkTxDirectCurrentTwoCarrierList-r16 UplinkTxDirectCurrentTwoCarrierList-r16 OPTIONAL,
    nonCriticalExtension                    RRCResumeComplete-v17-IEs  OPTIONAL
}

RRCResumeComplete-v17-IEs ::=        SEQUENCE {
    mobilityHistoryAvailWithHash-r16     ENUMERATED {true}            OPTIONAL,
    nonCriticalExtension                 SEQUENCE {}                  OPTIONAL
}
```

FIG. 11

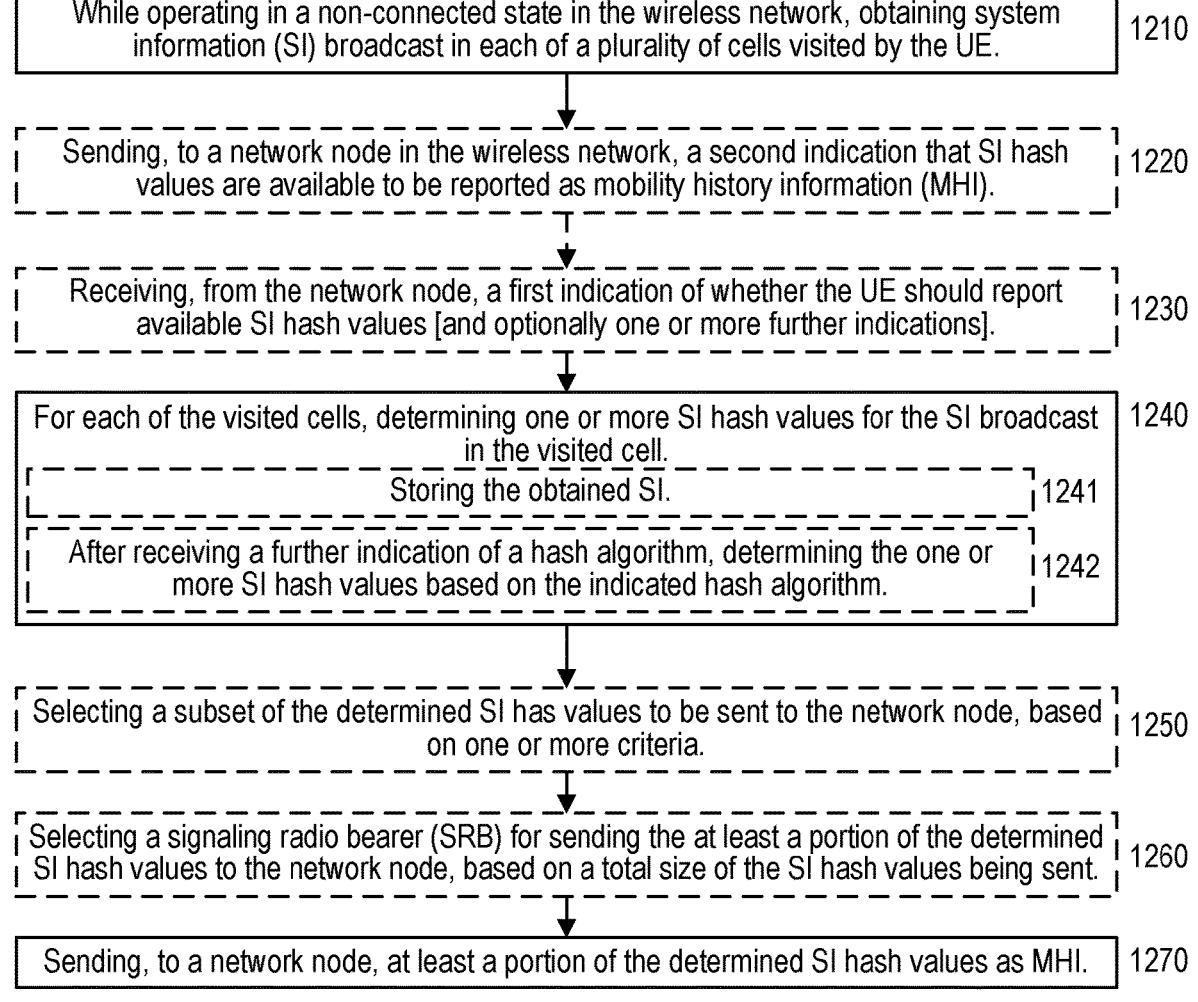

While operating in a non-connected state in the wireless network, obtaining system information (SI) broadcast in each of a plurality of cells visited by the UE. — 1210

Sending, to a network node in the wireless network, a second indication that SI hash values are available to be reported as mobility history information (MHI). — 1220

Receiving, from the network node, a first indication of whether the UE should report available SI hash values [and optionally one or more further indications]. — 1230

For each of the visited cells, determining one or more SI hash values for the SI broadcast in the visited cell. — 1240

Storing the obtained SI. — 1241

After receiving a further indication of a hash algorithm, determining the one or more SI hash values based on the indicated hash algorithm. — 1242

Selecting a subset of the determined SI has values to be sent to the network node, based on one or more criteria. — 1250

Selecting a signaling radio bearer (SRB) for sending the at least a portion of the determined SI hash values to the network node, based on a total size of the SI hash values being sent. — 1260

Sending, to a network node, at least a portion of the determined SI hash values as MHI. — 1270

FIG. 12

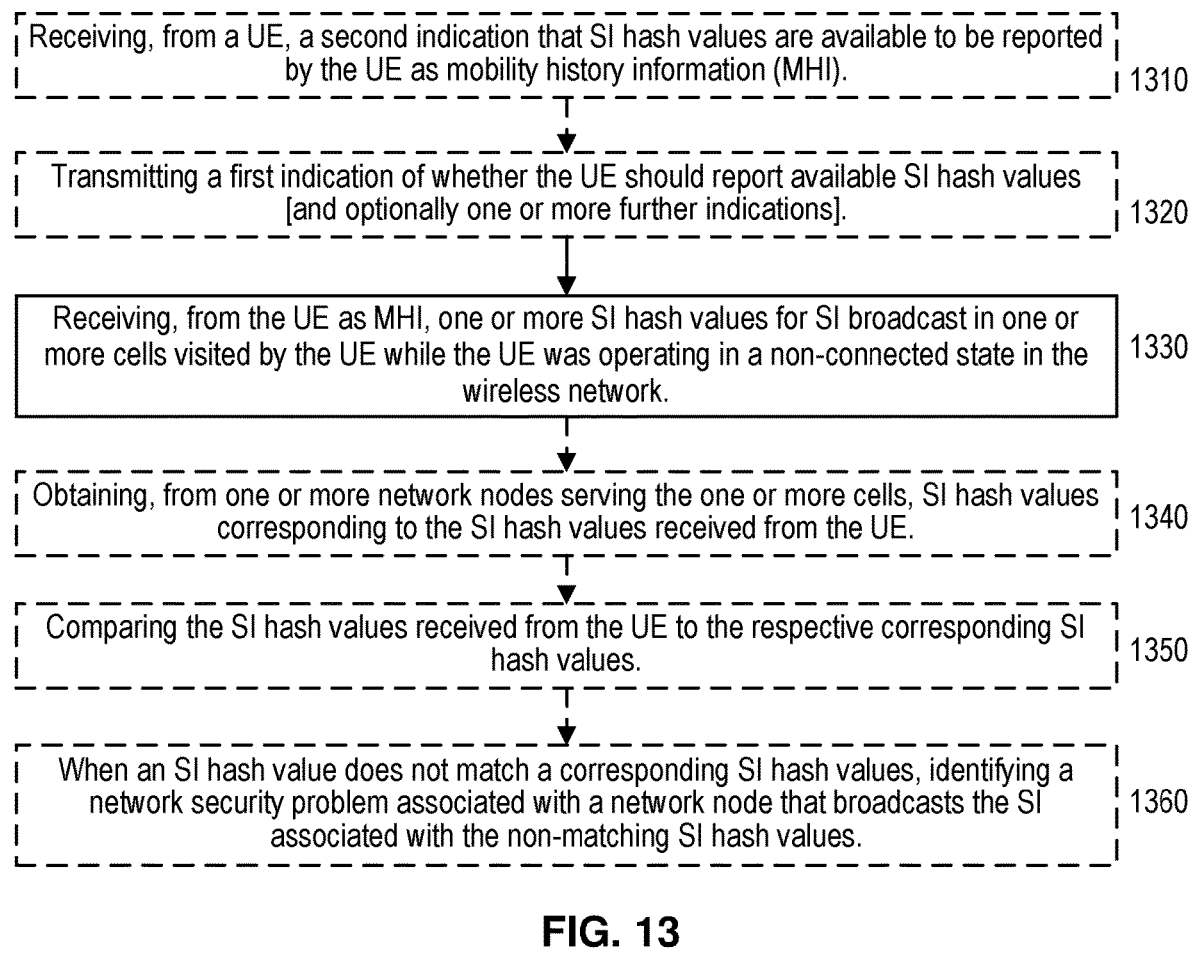

Receiving, from a UE, a second indication that SI hash values are available to be reported by the UE as mobility history information (MHI).        1310

Transmitting a first indication of whether the UE should report available SI hash values [and optionally one or more further indications].        1320

Receiving, from the UE as MHI, one or more SI hash values for SI broadcast in one or more cells visited by the UE while the UE was operating in a non-connected state in the wireless network.        1330

Obtaining, from one or more network nodes serving the one or more cells, SI hash values corresponding to the SI hash values received from the UE.        1340

Comparing the SI hash values received from the UE to the respective corresponding SI hash values.        1350

When an SI hash value does not match a corresponding SI hash values, identifying a network security problem associated with a network node that broadcasts the SI associated with the non-matching SI hash values.        1360

FIG. 13

REPORTING OF SYSTEM INFORMATION (SI) HASH VALUES

TECHNICAL FIELD

The present disclosure relates generally to wireless networks, and more specifically to techniques for detection of false base stations and other security risks in wireless networks, e.g., based on hashes of system information (SI) broadcast in cells of a wireless network.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that can communicate with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the SI interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

Logical channel communications between a UE and an eNB are via radio bearers. Signaling radio bearers (SRBs) SRB0, SRB1, and SRB2 are used for transport of RRC and NAS messages. For example, SRB0 is used for RRC connection setup. RRC connection resume, and RRC connection re-establishment. Once any of these operations has succeeded, SRB1 is used for handling RRC messages (including piggy backed NAS messages) and for NAS messages prior to SRB2 establishment. SRB2 is used for NAS messages and lower-priority RRC messages (e.g., logged measurement information). SRB0) and SRB1 are also used to establish and modify data radio bearers (DRBs) that carry user data between UE and eNB.

The fifth generation ("5G") of cellular systems, also referred to as New Radio (NR), is being standardized within 3GPP. NR is developed to support a variety of different use cases. These include enhanced mobile broadband (eMBB), machine type communications (MTC), ultra-reliable low latency communications (URLLC), and several other use cases.

5G/NR technology shares many similarities with fourth-generation LTE. For example, NR RRC layer includes RRC_IDLE and RRC_CONNECTED states, but adds another state known as RRC_INACTIVE. In addition to providing coverage via "cells," as in LTE, NR networks also provide coverage via "beams." In general, a DL "beam" is a coverage area of a network-transmitted reference signal (RS) that may be measured or monitored by a UE.

A UE can be configured to perform and report measurements to support minimization of drive testing (MDT), which is intended to reduce and/or minimize the requirements for manual testing of actual network performance (i.e., by driving around the geographic coverage of the network). MDT was first standardized for LTE in Rel-10 and is also included in NR releases. MDT can address various network performance improvements such as coverage optimization, capacity optimization, mobility optimization, quality-of-service (QOS) verification, and parameterization for common channels (e.g., PDSCH).

There have been some instances of unlawful deployment of "false base stations" in LTE and NR networks. These false base stations may broadcast SI that can cause receiving UEs to take unwanted actions when receiving UEs cannot distinguish false base stations from legitimate base stations of the network. For example, a false base station could broadcast some SI parameters that direct UEs to an unwanted frequency. Also, a false base station could modify SI such that the UE stays on a "fake cell" provided by the false base station, resulting a denial of service (DOS) attack on the legitimate network.

One possibility to combat such actions is for UEs to report to the network (e.g., EPC, 5GC) hash values of the SI (also referred to as "SI hash") that the UEs read from the cells that they encounter. In general, a "hash function" can be any function used to map data of arbitrary size to fixed-size values, which are referred to as "hash values", "hash codes", "digests", or simply "hashes". Commonly-used hash functions include MD5, SHA-1, SHA-256, etc. Since SI is the input data of interest in the present disclosure, the outputs are also referred to as "SI hash", "SI hash values", or "SI hash information".

The network can also query base stations for SI broadcast in served cells and calculate another hash on any SI obtained. A match between UE-reported and base station-reported SI hashes typically indicates a legitimate cell broadcasting valid SI, while no match can indicate a security problem such as a false base station and/or cell.

SUMMARY

Although MDT can be used for reporting SI hashes, there are various problems, issues, and/or difficulties with this approach. Accordingly, better techniques for reporting SI hashes are needed to combat false base stations and other security risks to LTE and NR networks.

Embodiments of the present disclosure provide security improvements to wireless communication networks, such as by facilitating solutions to overcome the exemplary problems summarized above and described in more detail below.

Some embodiments of the present disclosure include methods (e.g., procedures) for a UE (e.g., wireless device, MTC device, NB-IoT device, modem, etc. or component thereof) operating in a wireless network.

These exemplary methods can include, while operating in a non-connected state in the wireless network, obtaining SI broadcast in each of a plurality of cells visited by the UE. These exemplary methods can also include, for each of the visited cells, determining one or more SI hash values for the SI broadcast in the visited cell. These exemplary methods can also include sending, to a network node in the wireless network, at least a portion of the determined SI hash values as mobility history information (MHI).

In some embodiments, the MHI includes, for each visited cell:

an identifier of the visited cell;
a duration of time spent by the UE in the visited cell; and
zero or more SI hash values associated with the visited cell, wherein the MHI includes at least one SI hash value for one or more of the visited cells.

In some embodiments, the MHI also includes an indication of a hash algorithm used by the UE to determine the SI hash values.

In some of these embodiments, the MHI includes, for each visited cell, a single hash value for all SI broadcast in the visited cell.

In other of these embodiments, the MHI includes, for each visited cell, a plurality of SI hash values that are associated with respective non-overlapping subsets of the SI broadcast in the visited cell. In some variants, the SI broadcast in each visited cell includes the following three subsets: a master information block (MIB), a first system information block (SIB1), and a plurality of further system information blocks (SIBs). In other words, the SI hash values included in the MHI for each visited cell may include an SI hash value for MIB, an SI hash value for SIB1, and an SI hash value for the plurality of further SIBs.

For example, the MHI can include, for each visited cell, a bitmap comprising a plurality of bits associated with the respective plurality of subsets. The respective values of the bits in the bitmap indicate whether the MHI includes an SI hash value for the respective subsets. As another example, the MHI can include, for each SI hash value for each visited cell, an identifier of one of the subsets associated with the SI hash value.

In some embodiments, these exemplary methods can also include receiving, from the network node, a first indication of whether the UE should report available SI hash values. In some of these embodiments, the MHI is sent to the network node in response to the first indication indicating that the UE should report available SI hash values. In some variants, the first indication is received as broadcast SI. In other variants, these exemplary methods can also include sending, to the network node, a second indication that SI hash values are available to be reported as MHI.

In these variants, the first indication is received as a request for UE information responsive to the second indication.

In some embodiments, when the first indication indicates that the UE should report available SI hash values, the first indication is received together with further indications of one of the following:

a maximum number of SI hash values to report;
a maximum total size of SI hash values to report;
one or more subsets of broadcast SI for which the UE should report SI hash values; and
a hash algorithm to be used for determining SI hash values to be reported.

In some embodiments, determining the one or more SI hash values can include storing the obtained SI and, after receiving the further indication of the hash algorithm, determining the one or more SI hash values based on the indicated hash algorithm.

In some embodiments, these exemplary methods can also include selecting a signaling radio bearer (SRB) for sending the at least a portion of the determined SI hash values to the network node, based on a total size of the SI hash values being sent. In some embodiments, these exemplary methods can also include selecting a subset of the determined SI has values to be sent to the network node, based on one or more of the following criteria:

randomly,
maximum and/or minimum numbers of SI hashes per visited cell,
respective sizes of the determined SI hashes, and
chronological order in which the plurality of cells were visited by the UE.

Other embodiments include methods (e.g., procedures) for a network node (e.g., base station, eNB, gNB, ng-eNB, etc., or component thereof) of a wireless network (e.g., E-UTRAN, NG-RAN).

These exemplary methods can include receiving, from a UE as MHI, one or more SI hash values for SI broadcast in one or more cells visited by the UE while the UE was operating in a non-connected state in the wireless network.

In various embodiments, the SI hash values included in the received MHI can have any of the characteristics summarized above for the UE-related embodiments.

In some embodiments, these exemplary methods can also include transmitting a first indication of whether the UE should report available SI hash values, with the MHI being received from the UE in response to the first indication indicating that the UE should report available SI hash values. In some variants, the first indication is transmitted as broadcast SI, indicating whether all UEs receiving the first indication should report SI hash values. In other variants, these exemplary methods can also include receiving, from the UE, a second indication that SI hash values are available to be reported by the UE as MHI. In such case, the first indication is transmitted as a request for UE information responsive to the second indication.

In some embodiments, when the first indication indicates that the UE should report available SI hash values, the first indication is transmitted together with further indications of one of the following:

a maximum number of SI hash values to report;
a maximum total size of SI hash values to report;
one or more subsets of broadcast SI for which the UE should report SI hash values; and
a hash algorithm to be used for determining SI hash values to be reported.

In some embodiments, the MHI, including the SI hash values, is received on particular one of a plurality of available SRBs, with the particular SRB being dependent on the total size of received SI hash values. In some embodiments, the received SI hash values are a subset of all SI hash values available from the UE, with the subset being based on one or more of the following criteria:

random selection,
maximum and/or minimum numbers of SI hashes per visited cell,
respective sizes of the determined SI hashes, and
chronological order in which the plurality of cells were visited by the UE.

In some embodiments, these exemplary methods can also include the following operations: obtaining, from one or more network nodes serving the one or more cells, SI hash values corresponding to the SI hash values received from the UE: comparing the SI hash values received from the UE to the respective corresponding SI hash values; and when an SI hash value does not match a corresponding SI hash values, detecting a network security problem associated with a network node that broadcasts the SI associated with the non-matching SI hash values.

Other embodiments include UEs (e.g., wireless devices, IoT devices, or components thereof) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments can facilitate broad UE adoption and/or implementation of SI hash reporting, which is desirable to combat false base stations and other network security risks. Reporting SI hash values via MHI does not depend on user consent and explicit network configuration, which further facilitates adoption and/or implementation. In this manner, embodiments can facilitate improved network security due to reporting of SI hash information from many UEs that adopt and/or implement them.

These and other objects, features, and advantages of embodiments of the present disclosure will become apparent upon reading the following Detailed Description in view of the Drawings briefly described below.

BRIEF DESCRIPTION OF THE DRAWINGS

FIG. 5 shows an exemplary logged minimization of drive testing (MDT) procedure performed by a UE.

FIG. 6 shows an ASN.1 data structure for an exemplary VisitedCellInfoList information element (IE).

FIG. 7 shows an ASN.1 data structure for an exemplary UEInformationResponse message.

FIGS. 8-9 show ASN.1 data structures for two exemplary VisitedCellInfoList IEs, according to various embodiments of the present disclosure.

FIG. 10 shows an ASN.1 data structure for an exemplary UEInformationRequest message, according to various embodiments of the present disclosure.

FIG. 11 shows an ASN.1 data structure for an exemplary RRCResumeComplete message, according to various embodiments of the present disclosure.

FIG. 12 shows a flow diagram of an exemplary method (e.g., procedure) for a UE, according to various embodiments of the present disclosure.

FIG. 13 shows a flow diagram of an exemplary method (e.g., procedure) for a network node, according to various embodiments of the present disclosure.

DETAILED DESCRIPTION

Figure 1:
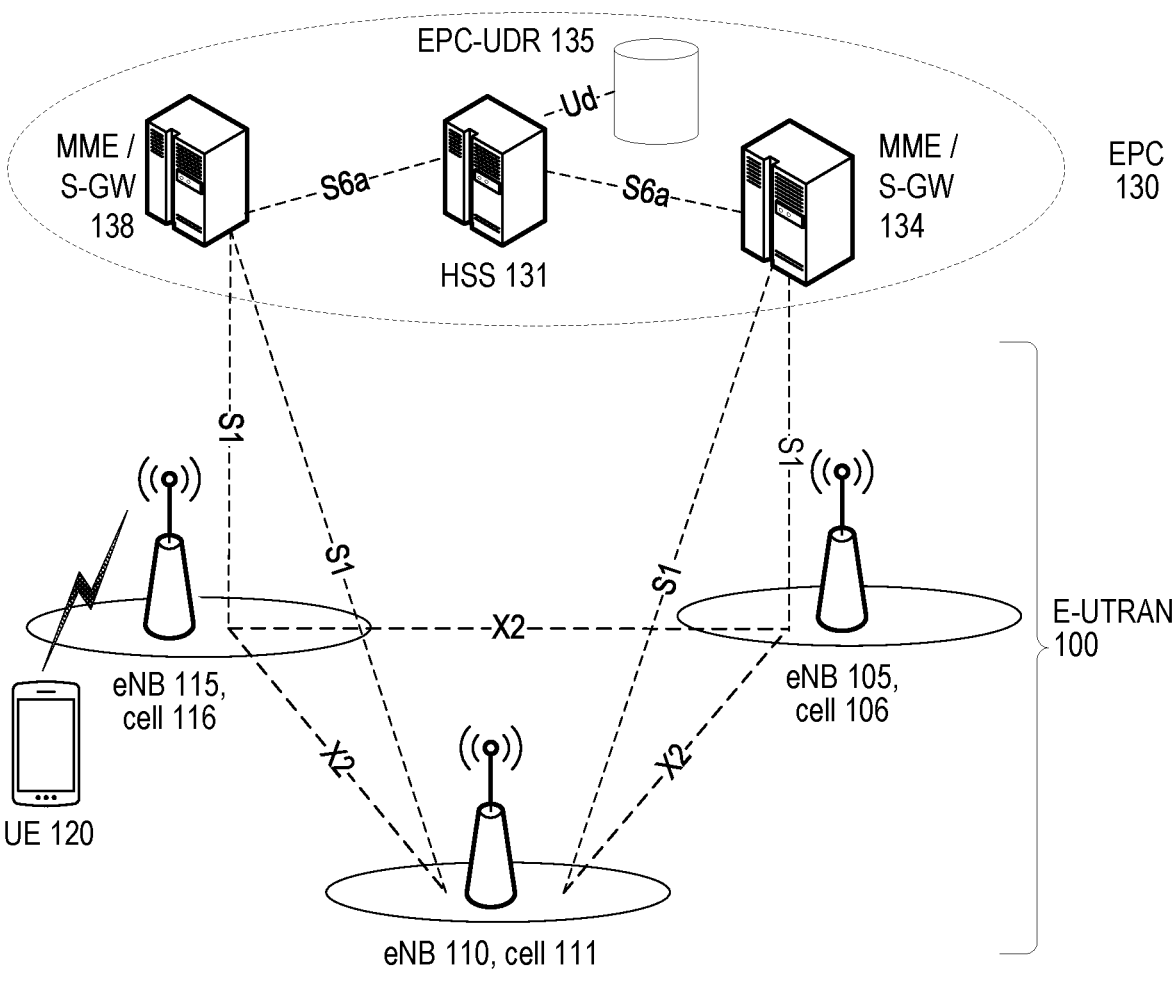
FIG. 1 is a high-level illustration of an exemplary architecture of the Long-Term Evolution (LTE) Evolved UTRAN (E-UTRAN) and Evolved Packet Core (EPC) network.
Figure 2:
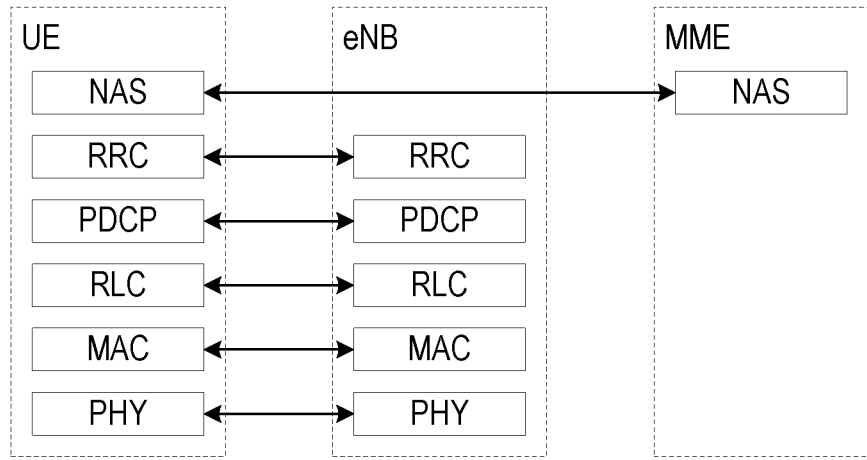
FIG. 2 shows exemplary protocol layers of the control-plane portion of the radio interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein can be applied to any other embodiment, wherever appropriate. Likewise, any advantage of any of the embodiments can apply to any other embodiments, and vice versa. Other objects, features, and advantages of the disclosed embodiments will become apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/ or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, although the minimization of drive testing (MDT) feature in LTE and NR can be used for reporting system information (SI) hashes to combat false base stations and other network security risks, there are various problems, issues, and/or difficulties with this approach. These issues are discussed in more detail after the following introduction to 5G/NR network and further discussion about MDT.

Figure 3:
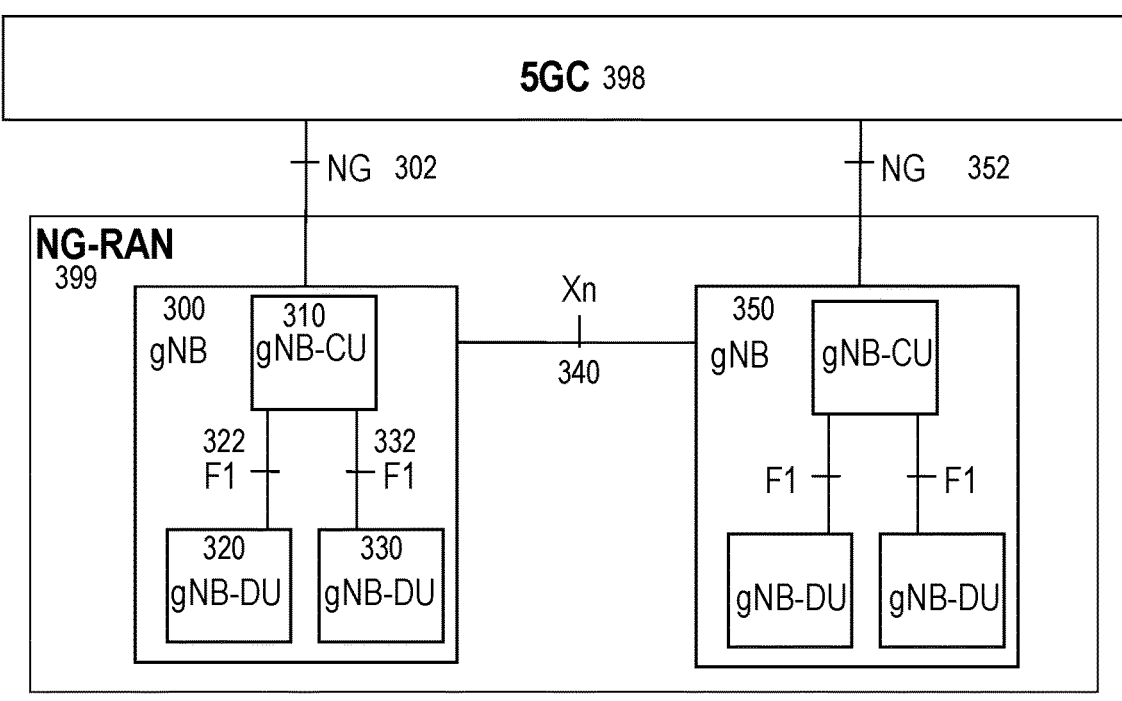
FIGS. 3-4 show two exemplary views of a 5G network architecture.

FIG. 3 illustrates a high-level view of an exemplary 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, whereas the gNBs can be connected to each other via one or more Xn interfaces, such as Xn interface 340 between gNBs 300 and 350 in FIG. 3. Each of the gNBs can support frequency division duplexing (FDD), time division duplexing (TDD), or a combination thereof on the NR interface to UEs.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," with the term "AMF" being discussed in more detail below.

The NG RAN logical nodes shown in FIG. 3 include a central (or centralized) unit (CU or gNB-CU) and one or more distributed (or decentralized) units (DU or gNB-DU). For example, gNB 300 in FIG. 3 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to its associated gNB-DUs over respective F1 logical interfaces, such as interfaces 322 and 332 shown in FIG. 3. The gNB-CU and connected gNB-DUs are only visible to other gNBs and the 5GC as a gNB, e.g., the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

Figure 4:
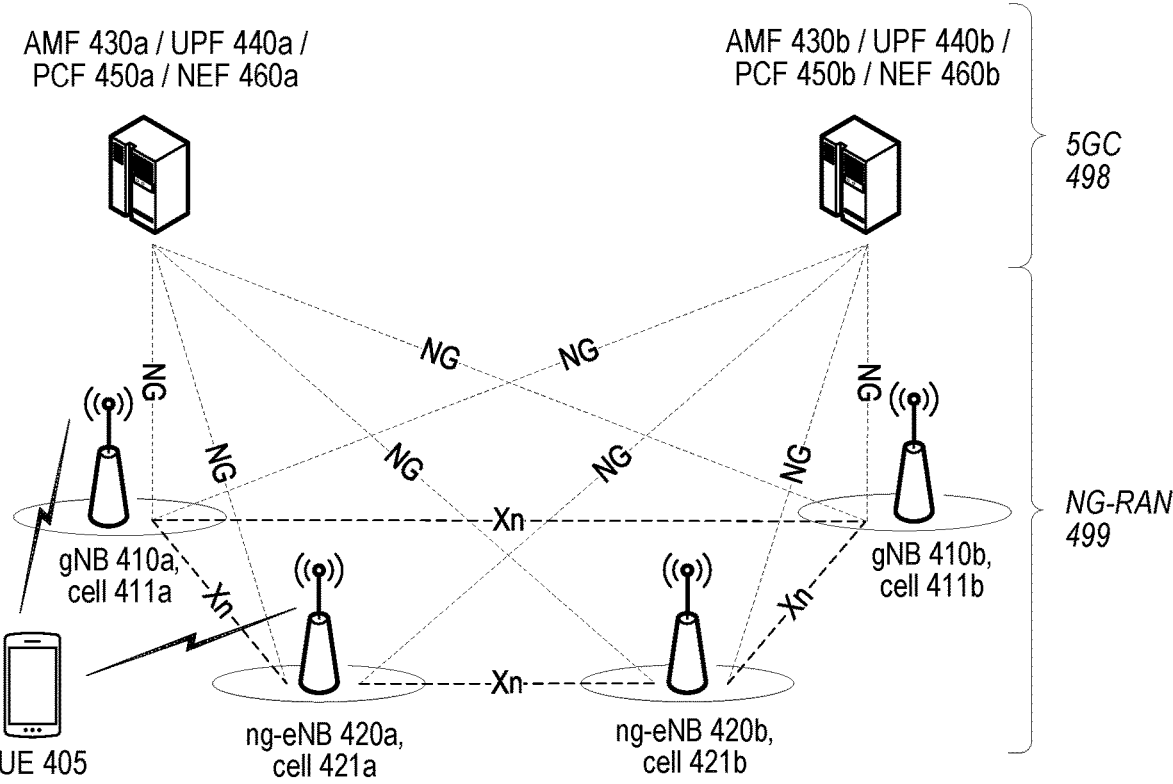

FIG. 4 shows another high-level view of an exemplary 5G network architecture, including NG-RAN 499 and 5GC 498. As shown in the figure, NG-RAN 499 can include gNBs (e.g., 410a,b) and ng-eNBs (e.g., 420a,b) that are interconnected with each other via respective Xn interfaces. The gNBs and ng-eNBs are also connected via the NG interfaces to 5GC 498, more specifically to access and mobility management functions (AMFs, e.g., 430a,b) via respective NG-C interfaces and to user plane functions (UPFs, e.g., 440a,b) via respective NG-U interfaces. Moreover, the AMFs can communicate with one or more policy control functions (PCFs, e.g., 450a,b) and network exposure functions (NEFs, e.g., 460a,b).

Each of the gNBs can support the NR radio interface including FDD, TDD, or a combination thereof. In contrast, each of ng-eNBs can support the LTE radio interface but, unlike conventional LTE eNBs (e.g., in FIG. 1), connect to the 5GC via the NG interface. Each or gNB or ng-eNB can serve a geographic coverage area including one more cells, such as cells 411a-b and 421a-b shown in FIG. 4. Depending on the cell in which it is located, a UE 405 can communicate with a gNB or and ng-eNB serving that cell via the NR or LTE radio interface, respectively.

In some embodiments, the gNBs and ng-eNBs can also use various directional beams to provide coverage in the respective cells. In general, a DL "beam" is a coverage area of a network-transmitted reference signal (RS) that may be measured or monitored by a UE. In NR, for example, such RS can include any of the following, alone or in combination: synchronization signal/PBCH block (SSB). CSI-RS, tertiary reference signals (or any other sync signal), positioning RS (PRS). DMRS, phase-tracking reference signals (PTRS), etc. In general, SSB is available to all UEs regardless of RRC state, while other RS (e.g., CSI-RS. DM-RS. PTRS) are associated with specific UEs that have a network connection, i.e., in RRC_CONNECTED state.

MDT was standardized as a UE-assisted framework in which various measurements and information are collected by UEs in all RRC states and then reported to the network. MDT has been specified for both LTE and NR in 3GPP TS 37.320 (v16.4.0), and MDT-related features are found in the LTE and NR RRC specifications, i.e., 3GPP TS 36.331 (v16.4.0) and 38.331 (v16.4.0), respectively. The various use cases for MDT are described in 3GPP TR 36.805 (v9.0.0) and include coverage optimization, mobility optimization, capacity optimization, parameterization for common channels, and QoS verification.

In general, a UE can be configured by the network to perform logged MDT and/or immediate MDT measurements. For logged MDT, a UE in RRC_IDLE or RRC_INACTIVE state is configured to perform periodic and event-triggered MDT logging after receiving MDT configuration(s) from the network when previously in RRC_CONNECTED state. The UE reports DL RS strength/quality measurements (e.g., RSRP/RSRQ) together with time information, detailed location information (if available), and WLAN/Bluetooth signal measurements (if available) when the UE returns to RRC_CONNECTED state. The DL measurements for logged MDT are already performed by the UE for cell reselection, such that logged MDT does not impose additional DL measurement requirements.

FIG. 5 shows an exemplary logged MDT procedure performed by a UE. In this procedure, the UE receives the MDT configuration(s) while in RRC_CONNECTED state and starts timer T330, which defines the MDT logging duration. Once the UE enters RRC_IDLE (or RRC_INACTIVE, not shown), the UE starts periodic MDT logging in accordance with the configuration(s), which defines an MDT logging interval. Upon exiting RRC_IDLE and entering RRC_CONNECTED, the UE stops the periodic MDT logging but continues to run T330. Upon exiting RRC_CONNECTED and entering RRC_IDLE, the UE restarts the periodic MDT logging and continues until T330 expires. Subsequently, the UE can report the logged MDT measurements upon reentering RRC_CONNECTED state (not shown).

For event-triggered logged MDT, the UE receives an eventType and the logging interval from the network. The UE logs measurement reports at every logging interval during an event corresponding to eventType.

The logged MDT configuration shown in FIG. 5 is sent to UE by a LoggedMeasurementConfiguration RRC message. This message includes traceReference, tce-Id. and traceRecondingSessionRef which are used to identify a trace collection entity (TCE) that originated the logged MDT request and should receive the corresponding logged MDT report by the UE. However, a UE can only have a single logged MDT configuration for each radio access technology (RAT), i.e., one for NR, one for LTE, etc.

When the network provides a new logged MDT configuration, any previously received logged MDT configurations for the same RAT will be replaced by the new one and any measurements logged in accordance with the previous logged MDT configuration will be cleared. Thus, it is the network's responsibility to retrieve any relevant data before providing a new configuration. Similarly, if a PLMN that does not belong to the UE's MDT PLMN list provides a logged MDT configuration, any previously received logged MDT configurations and any measurements logged will be cleared and overwritten without being retrieved.

Due to user privacy concerns, a network can send an MDT configuration to a UE only if the UE (or associated user) has given consent. The RAN (e.g., E-UTRAN, NG-RAN) is responsible for obtaining user consent but does not store that information. Rather, the RAN obtains user consent information from the core network (e.g., EPC, 5GC) before initiating an MDT session. Due to the need for user consent issues and MDT not being critical for basic operation of a UE, logged MDT feature currently is not widely implemented in UEs and networks.

Further, before the UE can report logged MDT measurements, the UE must first receive a logged MDT configuration. As such, the network has to pick certain UEs to perform MDT measurement logging and it is possible that UE mobility patterns are different from an area of most interest for the network, such that UEs selected to perform MDT measurements are not collecting measurements in the area of most interest.

Although it has been proposed that UEs should report SI hash information for visited cells in logged MDT measurements, this approach has various problems, issues, and/or difficulties in view of the above. For example, a UE would have to support most—if not all—of the logged MDT framework in order to report SI hashes, and many UEs currently do not. As such, this approach would place a significant burden on UE implementation, which may slow and/or prevent adoption of such features. Additionally, the concerns discussed above about user privacy/consent for MDT logging and reporting may further slow and/or prevent adoption of such features. Also, the difficulty in selecting and configuring UEs that can provide relevant MDT measurements may further slow and/or prevent adoption of such features. Since collecting and reporting SI hash information can combat false base stations and other security risks in RANs, a solution better than MDT is needed.

Embodiments of the present disclosure can address these and other problems, issues, and/or difficulties by providing novel, flexible, and efficient techniques for enhanced mobility history information (MHI) reporting by a UE and beneficial use of such enhanced MHI reports by a network node. In various embodiments, SI hashes of visited cells can be included in MHI in various forms, structures, arrangements, etc. as described in more detail below.

Mobility history information (MHI) was introduced in LTE and is also supported in NR. As part of its MHI measurements, a UE stores a cell identifier of its current serving cell and information about how long the UE has stayed in this serving cell. The UE keeps such MHI for up to 16 previous serving cells. UE MHI also includes information about how long the UE has been out of the coverage.

Based on reported MHI, the network can estimate a UE's mobility characteristics such as speed, direction, etc. MHI is accumulated by the UE regardless of its RRC state, i.e., in RRC_CONNECTED, RRC_IDLE, and RRC_INACTIVE. Even so, there are various problems, issues, and/or difficulties with using MHI to predict mobility characteristics because MHI collected in the different RRC states can have different characteristics and/or properties.

The UE accumulates MHI in VarMobilityHistoryReport structure, including a VisitedCellInfoList. For NR, the procedural specification for how a UE accumulates MHI is in 3GPP TS 38.331 (v16.4.0) section 5.7.9. FIG. 6 shows an ASN.1 data structure for an exemplary VisitedCellInfoList information element (IE).

A UE can indicate the availability of MHI via the mobilityHistoryAvail field in RRCSetupComplete or RRCResumeComplete messages. Sending of this indication in itself acts as an indication that the UE has the capability to store the MHI. Based on this indication, the content of the MHI can be fetched upon request by the network as part of a UE information Request procedure.

Speed-based scaling of cell reselection parameters for mobility of UEs operating in a non-connected state (e.g., RRC_IDLE, RRC_INACTIVE, or state with similar properties as these) is enabled by broadcast SI from the network. FIG. 7 shows an ASN.1 data structure for an exemplary system information block 2 (SIB2). In particular, the speedStateReselectionPars IE controls the speed-based scaling. The UE needs to remember its history of visited cells for the most recent period of duration t-Evaluation in mobilityStateParameters field.

The exact methodology used by the UE to compute speed is defined in 3GPP TS 38.304 (v16.4.0) section 5.2.4.3.0, and includes the following state detection criteria:

Normal-mobility state criteria: If number of cell reselections during time period $T_{CRmax}$ is less than $N_{CR\_M}$.

Medium-mobility state criteria: If number of cell reselections during time period $T_{CRmax}$ is greater than or equal to $N_{CR\_M}$ but less than or equal to $N_{CR\_H}$.

High-mobility state criteria: If number of cell reselections during time period $T_{CRmax}$ is greater than $N_{CR\_H}$.

$T_{CRmax}$: duration for evaluating allowed amount of cell reselection(s).

$N_{CR\_M}$: maximum number of cell reselections to enter Medium-mobility state.

$N_{CR\_H}$: maximum number of cell reselections to enter High-mobility state.

Since the UE needs to remember the number of cells in which the UE has resided during the most recent t-Evaluation for cell reselection purposes, the UE already has partial MHI and can construct full MHI by including the time spent in each of these cells. Thus, MHI is a relatively simple implementation for UEs, particularly in comparison to MDT logging. Also, unlike MDT logging, the UE does not require any explicit configuration to store the MHI—it will be done as default for all UEs supporting MHI.

Accordingly, a UE using MHI (e.g., visitedCellInfoList) to provide SI hashes to the network facilitates broad UE adoption and/or implementation of SI hash reporting, which is desirable to combat false base stations and other network security risks. Another advantage is that, unlike reporting SI hashes with MDT, reporting via MHI does not depend on user consent and explicit network configuration, which further facilitates adoption and/or implementation. In this manner, embodiments of the present disclosure can facilitate improved network security due to reporting of SI hash information from many UEs that adopt and/or implement them.

In general, a UE can include visitedCellInfoList (e.g., as shown in FIG. 6) in a mobilityHistoryReport IE of a UEInformationResponse RRC message. FIG. 7 shows an ASN.1 data structure for an exemplary UEInformationResponse message that includes fields such as logMeasReport and measResultIdleEUTRA in addition to mobilityHistoryReport.

In some embodiments, a UE can provide SI hash information in mobilityHistoryReport or a field of mobilityHistoryReport. For example, the SI hash information may be included as an extension of the VisitedCellInfo-r16 IE, which is an element of the list VisitedCellInfoList-r16. Each VisitedCellInfo-r16 element corresponds to one cell that the UE has visited.

FIG. 8 shows an ASN.1 data structure for an exemplary VisitedCellInfoList IE according to these embodiments. As compared to the conventional IE shown in FIG. 6, the IE in FIG. 8 includes another list named hash-InformationList-r17, which is a list of HASH-Information-r 17 elements, each of which carries:

an integer index, 0 . . . maxSIB (where maxSIB is typically 32), and
a hash.

For example, if the UE sends hashes for MIB, SIB1 and SIB4, the UE will include the following three elements in the list:

index 0 and a hash of the MIB,
index 1 and a hash of SIB1, and
index 4 and a hash of SIB4.

In other embodiments, the UE could report a single hash calculated over all SI for a visited cell, or at least over the parts of SI that the UE reads, which may depend on information needed by the UE and the functionality the UE supports. For example, MIB and SIB1 is read by all UEs while SIB9 (containing universal time coordinate, UTC, information) is only read by the UEs supporting relevant functionality. Hence, the reported SI hash for a cell may be UE-dependent, such that the UE also needs to report which parts of SI are included in the hash.

FIG. 9 shows an ASN.1 data structure for an exemplary VisitedCellInfoList IE according to these embodiments. As compared to the conventional IE shown in FIG. 6, the IE in FIG. 9 includes a single SI hash and a 33-bit bitmap is used to indicate which of SI blocks (e.g., MIB, SIB1-SIB32) have contents included in the single SI hash. The bitmap could potentially be made shorter if some blocks are always included in the SI hash calculation (e.g., MIB or SIB1) or if some SIBs are always excluded (e.g., SIB9). One reason for excluding some SIBs is due to frequent changes of their contents (e.g., UTC in SIB9), such that the network would have difficulties determining a version to be used for calculating another SI hash for comparison, verification, and/or problem detection.

In some embodiments, a UE may also need to report other information to assist the network in verifying the SI hash value, e.g., an algorithm used for the hash calculation.

One benefit of adding SI hash information in mobilityHistoryReport is that all UEs are expected to implement that IE of the UEInformationResponse message, while other fields or IEs of that message (e.g., logMeasReport) may be optional and/or implemented by a smaller portion of UEs. Even though mobilityHistoryReport may be supported by almost all UEs, it is possible that SI hash reporting is not mandatory. Hence, only a subset of UEs may support sending SI hash information in the (mandatory) mobilityHistoryReport.

Conventionally, a UE sends the VisitedCellInfoList in response to a request sent from the network during connection establishment. In some embodiments, a UE can include SI hash information only if requested by the network to do so. This approach has a benefit that the message size could be kept small by excluding SI hash information except when the network specifically requires/requests it. For example, this may be desirable if the SI hash information has a large size.

FIG. 10 shows an ASN.1 data structure for an exemplary UEInformationRequest-r16 message according to these embodiments. As compared to a conventional UJEInformationRequest-r16 message, the message in FIG. 10 includes a UEInformationRequest-r17-IEs field, which includes a systemInformationHASH-Req-r17 sub-field that can be present (with value "true") indicating a request or be absent indicating no request. If the network sends systemInformation-HASH-Req-r17, the UE sends SI hash information according to any of the embodiments described above.

In other embodiments, the network can include indicate a request for SI hash information in broadcast SI, e.g., using a similar technique as illustrated in FIG. 10. All UEs reading the SIB including the request would provide SI hash information in MHI accordingly.

In other embodiments, the network can indicate a limit of the number of MIB/SIB hashes or which MIB/SIB hashes the UE should provide, which can be set according to any need to reduce size of reported SI hash information. On the other hand, the network can indicate a high/large limit if the network does not want the UE to omit any hashes. Alternately, the network could also indicate specific MIB/SIBs for which the UE should report hash values, e.g., MIB and SIB1 but not any of the SIBs 2-32.

In other embodiments, a UE always includes available SI hash information independent of any network request. The network could then ignore any reported SI hash information that is not relevant for the network.

Conventionally, a UE includes a mobilityHistoryAvail flag in either an RRORESume-Complete message or an RRCReconfigurationComplete message to indicate that it has stored MHI that can be reported to the network. In some embodiments, the UE could include an additional flag (e.g., mobilityHistoryAvailWithHash) in RRCResumeComplete or RRCReconfiguration-Complete to indicate that it has stored MHI included that includes SI hash information.

FIG. 11 shows an ASN.1 data structure for an exemplary RRCResumeComplete message according to these embodiments. As compared to a conventional RRC ResumeComplete message, the message in FIG. 11 includes an RRCResumeComplete-r17-IEs field that includes an optional mobilityHistoryAvailWithHash-r17 field, which if present indicates that the UE has MHI including SI hash information available to report to the network.

In some embodiments, the network can also provide additional configuration information for SI hash reporting by UEs, such as an algorithm to use for hash calculation. For example, this configuration information could be included in a UEInformationRequest message sent by dedicated RRC signaling or in broadcast SI (e.g., in a SIB). When the network specifies the hash algorithm in this manner, a UE needs to store SI read from visited cells and then apply the specified hash algorithm to the stored SI before reporting the SI hash values to the network. For example, if a UE enters two different cells in which broadcast SI indicates two different hash algorithms to be used, the UE may compute and report SI hash information on the same stored SI but using the different hash algorithms.

As described above the SI hashes may be included in a message such as the UEInformationResponse. The UE may select an SRB to send this message based on whether SI hashes are included. For example, if the UE does not include SI hashes the UE may send the message on SRB1, but if the UE includes SI hashes the UE sends the message on SRB2. If SI hashes are included the size of the message increases and hence it may be preferable to send it with relatively low priority (e.g., on SRB2) to avoid blocking some higher-priority signaling (e.g., on SRB1). Alternately, the SI hash information could on an even lower-priority SRB, such as SRB4 used for quality of experience (QoE) reporting. In another variant, a new message can be defined for SI hash reporting, with the new message specified to be sent on a particular SRB (e.g., SRB2 or SRB4).

Another approach is that the UE sends the message on SRB1 if the size of the message is lower than a certain threshold, otherwise it is sent on SRB2. Yet another approach is that the message is sent on the lowest-priority SRB available. For example, the message can be sent on SRB2 if available and otherwise on SRB1. Similarly, the message can be sent on SRB4 if available, otherwise on SRB2 if available, and otherwise on SRB1.

As briefly discussed above, the size of the SI hash information may be significant. For example, one SI hash value may be 16 bytes and if the UE has visited 16 cells and computed three (3) MIB/SIB hashes for each of those cells, the UE will have 768 bytes of SI hash information to report. In some embodiments, to reduce the size of SI hash reporting the UE may filter and only send certain stored SI hashes and omit or refrain from sending other stored SI hashes.

In some embodiments, a UE can select SI hashes to send/omit such that the number of hashes sent for each cell does not exceed a number that is predetermined (e.g., specified), configured by the network, or selected by the UE. For example, if for a particular cell the UE has acquired three hashes, the UE may select to send only one of the hashes for that cell. The UE may select which of the stored SI hashes to send for each cell in various ways, such as randomly, in chronological order, in reverse chronological order, in descending or ascending order of size, etc. As an example, the network can indicate how many SI hashes to provide for each cell in the request (e.g., UEInformation-Request) for MHI including the SI hashes.

In other embodiments, a UE can select SI hashes to send/omit without regard to any specific distribution among cells. As an example, a UE may omit all stored SI hashes for a particular cell but may include one or more stored SI hashes for another cell. The UE may select which of the stored SI hashes to send for each cell in various ways, such as randomly, in chronological order, in reverse chronological order, in descending or ascending order of size, etc. For example, the UE may select the most recently stored SI hashes, e.g., up to a total number or total size of SI hashes reported.

In other embodiments, the network can indicate which SI hashes that it wants the UE to report. For example, the network could indicate that it is only interested in the hash of MIB and SIB1-5. The UE would then report the hashes of the SIBs from this set that it has available. For example, the network can indicate this information with a bitmap included in UEInformationRequest or in broadcast SI.

In other embodiments, each SI hash reported by the UE can be for more than one MIB/SIB. A variant of this could be that the UE reports the SI hash of an entire SI message rather than individual SIBs. An SI message is a container used to group SIBs that have similar periodicity requirements and is transmitted as a single transport block (TB) to the UE.

The embodiments described above can be further illustrated with reference to FIGS. 12-13, which depict exemplary methods (e.g., procedures) for a UE and a network node, respectively. Put differently, various features of the operations described below correspond to various embodiments described above. Furthermore, the exemplary methods shown in FIGS. 12-13 can be used cooperatively to provide various exemplary benefits and solve various exemplary problems, including those described herein. Although FIGS. 12-13 show specific blocks in particular orders, the operations of the exemplary methods can be performed in different orders than shown and can be combined and/or divided into blocks having different functionality than shown. Optional blocks or operations are indicated by dashed lines.

In particular, FIG. 12 shows a flow diagram of an exemplary method (e.g., procedure) for a UE operating in a wireless network, according to various embodiments of the present disclosure. The exemplary method can be performed by a UE (e.g., wireless device, MTC device. NB-IoT device, modem, etc. or component thereof) such as described elsewhere herein.

The exemplary method can include the operations of block 1210, where the UE can, while operating in a non-connected state (e.g., RRC_IDLE, RRC_INACTIVE, or state with similar properties as these) in the wireless network, obtain SI broadcast in each of a plurality of cells visited by the UE (i.e., while the UE is operating in the non-connected state). The exemplary method can also include the operations of block 1220, where the UE can, for each of the visited cells, determine one or more SI hash values for the SI broadcast in the visited cell. The exemplary method can also include the operations of block 1270, where the UE can send, to a network node in the wireless network, at least a portion of the determined SI hash values as mobility history information (MHI). For example, the sending operations in block 1270 can occur after the UE has returned to and/or entered a connected state (e.g., RRC_CO-NNECTED or state with similar properties) in the wireless network.

In some embodiments, the MHI includes, for each visited cell:

an identifier of the visited cell;
a duration of time spent by the UE in the visited cell; and
zero or more SI hash values associated with the visited cell, wherein the MHI includes at least one SI hash value for one or more of the visited cells.

In some embodiments, the MHI also includes an indication of a hash algorithm used by the UE to determine the SI hash values.

In some of these embodiments, the MHI includes, for each visited cell, a single hash value for all SI broadcast in the visited cell.

In other of these embodiments, the MHI includes, for each visited cell, a plurality of SI hash values that are associated with respective non-overlapping subsets of the SI broadcast in the visited cell. In some variants, the SI broadcast in each visited cell includes the following three subsets: a MIB, a first SIB (SIB1), and a plurality of further SIBs. In other words, the SI hash values included in the MHI for each visited cell may include an SI hash value for MIB, an SI hash value for SIB1, and an SI hash value for the plurality of further SIBs.

For example, the MHI can include, for each visited cell, a bitmap comprising a plurality of bits associated with the respective plurality of subsets (i.e., one bit per subset). The respective values of the bits in the bitmap indicate whether the MHI includes an SI hash value for the respective subsets. The si-included-in-hash field shown in FIG. 9 is an example of these embodiments.

As another example, the MHI can include, for each SI hash value for each visited cell, an identifier of one of the subsets associated with the SI hash value. The sib-Or-MIB-number-r17 field in FIG. 8 is an example of these embodiments.

In some embodiments, the exemplary method can also include the operations of block 1230, where the UE can receive, from the network node, a first indication of whether the UE should report available SI hash values. In such embodiments, the MHI is sent to the network node (e.g., in block 1270) in response to the first indication indicating that the UE should report available SI hash values. In some variants, the first indication is received as broadcast SI. In other variants, the exemplary method can also include the operations of block 1220, where the UE can send, to the network node, a second indication that SI hash values are available to be reported as MHI. In these variants, the first indication is received (e.g., in block 1230) as a request for UE information responsive to the second indication.

In some of these embodiments, when the first indication indicates that the UE should report available SI hash values, the first indication is received together with further indications of one of the following:

a maximum number of SI hash values to report;
    a maximum total size of SI hash values to report;
    one or more subsets of broadcast SI for which the UE should report SI hash values; and
    a hash algorithm to be used for determining SI hash values to be reported.

In some of these embodiments, determine the one or more SI hash values in block 1240 can include the operations of sub-blocks 1241-1242, where the UE can store the obtained SI and after receiving the further indication of the hash algorithm (e.g., received with the first indication), determine the one or more SI hash values based on the indicated hash algorithm. Note that in some variants, the operations of sub-block 1241 may be performed before the operations of block 1230.

In some embodiments, the exemplary method can also include the operations of block 1260, where the UE can select an SRB for sending the at least a portion of the determined SI hash values to the network node (e.g., in block 1270), based on a total size of the SI hash values being sent.

In some embodiments, the exemplary method can also include the operations of block 1250, where the UE can select a subset of the determined SI hash values to be sent to the network node (e.g., in block 1270), based on one or more of the following criteria:

randomly,
    maximum and/or minimum numbers of SI hashes per visited cell,
    respective sizes of the determined SI hashes, and
    chronological order in which the plurality of cells were visited by the UE.

In addition, FIG. 13 shows a flow diagram of an exemplary method (e.g., procedure) for a network node of a wireless network, according to various embodiments of the present disclosure. The exemplary method can be performed by a network node (e.g., base station, eNB, gNB, ng-eNB, etc., or component thereof) such as described elsewhere herein.

The exemplary method can include the operations of block 1330, where the network node can receive from a UE one or more SI hash values for SI broadcast in one or more cells visited by the UE while the UE was operating in a non-connected state (e.g., RRC_IDLE, RRC_INACTIVE, or state with similar properties as these) in the wireless network. The one or more SI has values can be received as MHI. For example, the receiving operations in block 1330 can occur after the UE has returned to and/or entered a connected state (e.g., RRC_CONNECTED or state with similar properties) in the wireless network.

In some embodiments, the MHI includes, for each visited cell:

an identifier of the visited cell;
    a duration of time spent by the UE in the visited cell; and
    zero or more SI hash values associated with the visited cell, wherein the MHI includes at least one SI hash value for one or more of the visited cells.

In some embodiments, the MHI also includes an indication of a hash algorithm used by the UE to determine the SI hash values.

In some of these embodiments, the MHI includes, for each visited cell, a single hash value for all SI broadcast in the visited cell.

In other of these embodiments, the MHI includes, for each visited cell, a plurality of SI hash values that are associated with respective non-overlapping subsets of the SI broadcast in the visited cell. In some variants, the SI broadcast in each visited cell includes the following three subsets: a MIB, a first SIB (SIB1), and a plurality of further SIBs. In other words, the SI hash values included in the MHI for each visited cell may include an SI hash value for MIB, an SI hash value for SIB1, and an SI hash value for the plurality of further SIBs.

For example, the MHI can include, for each visited cell, a bitmap comprising a plurality of bits associated with the respective plurality of subsets (i.e., one bit per subset). The respective values of the bits in the bitmap indicate whether the MHI includes an SI hash value for the respective subsets. The si-included-in-hash field shown in FIG. 9 is an example of these embodiments.

As another example, the MHI can include, for each SI hash value for each visited cell, an identifier of one of the subsets associated with the SI hash value. The sib-Or-MIB-number-r17 field in FIG. 8 is an example of these embodiments.

In some embodiments, the exemplary method can also include the operations of block 1320, where the network node can transmit a first indication of whether the UE should report available SI hash values. In some of these embodiments, the MHI is received from the UE (e.g., in block 1330) in response to the first indication indicating that the UE should report available SI hash values. In some variants, the first indication is transmitted as broadcast SI, indicating whether all UEs receiving the first indication should report SI hash values. In other variants, the exemplary method can also include the operations of block 1310, where the network node can receive, from the UE, a second indication that SI hash values are available to be reported by the UE as MHI. In such case, the first indication is transmitted (e.g., in block 1320) as a request for UE information responsive to the second indication.

In some embodiments, when the first indication indicates that the UE should report available SI hash values, the first indication is transmitted (e.g., in block 1320) together with further indications of one of the following:

a maximum number of SI hash values to report;
    a maximum total size of SI hash values to report;
    one or more subsets of broadcast SI for which the UE should report SI hash values; and
    a hash algorithm to be used for determining SI hash values to be reported.

In some embodiments, the MHI—including the SI hash values—is received (e.g., in block 1330) on a particular one of a plurality of available SRBs, with the particular SRB being dependent on the total size of received SI hash values. This operation and/or condition is complementary to FIG. 12 block 1260, discussed above.

In some embodiments, the received SI hash values are a subset of all SI hash values available from the UE, with the subset being based on one or more of the following criteria:

random selection, maximum and/or minimum numbers of SI hashes per visited cell, respective sizes of the determined SI hashes, and chronological order in which the plurality of cells were visited by the UE.

This operation and/or condition is complementary to FIG. 12 block 1250, discussed above.

In some embodiments, the exemplary method can also include the operations of blocks 1340-1360. In block 1340, the network node can obtain, from one or more network nodes serving the one or more cells, SI hash values corresponding to the SI hash values received from the UE. In block 1350, the network node can compare the SI hash values received from the UE to the respective corresponding SI hash values. In block 1360, the network node can, when an SI hash value does not match a corresponding SI hash values, detect a network security problem associated with a network node that broadcasts the SI associated with the non-matching SI hash values.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 14:
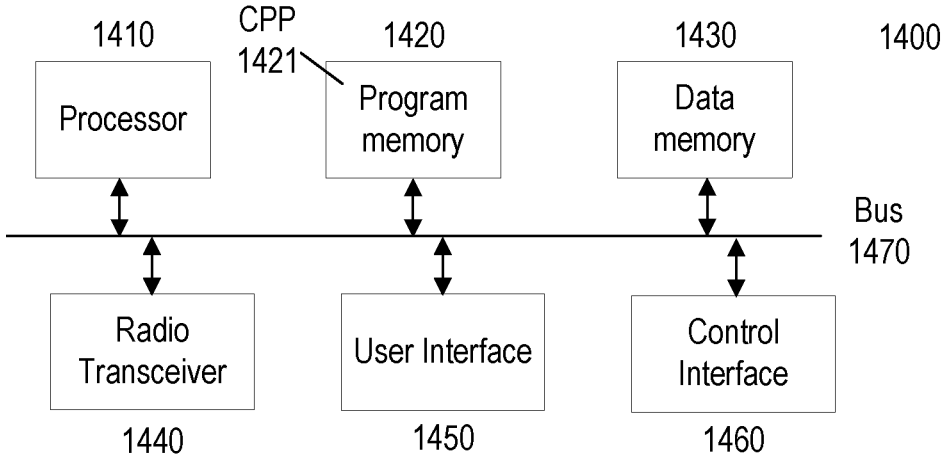
FIG. 14 is a block diagram of an exemplary wireless device or UE according to various embodiments of the present disclosure.

FIG. 14 shows a block diagram of an exemplary wireless device or UE 1400 (hereinafter referred to as "UE 1400") according to various embodiments of the present disclosure, including those described above with reference to other figures. For example, UE 1400 can be configured by execution of instructions, stored on a computer-readable medium, to perform operations corresponding to one or more of the exemplary methods described herein.

UE 1400 can include a processor 1410 (also referred to as "processing circuitry") that can be operably connected to a program memory 1420 and/or a data memory 1430 via a bus 1470 that can comprise parallel address and data buses, serial ports, or other methods and/or structures known to those of ordinary skill in the art. Program memory 1420 can store software code, programs, and/or instructions (collectively shown as computer program product (CPP) 1421 in FIG. 14) that, when executed by processor 1410, can configure and/or facilitate UE 1400 to perform various operations, including operations corresponding to various exemplary methods described herein. As part of or in addition to such operations, execution of such instructions can configure and/or facilitate UE 1400 to communicate using one or more wired or wireless communication protocols, including one or more wireless communication protocols standardized by 3GPP. 3GPP2, or IEEE, such as those commonly known as 5G/NR. LTE. LTE-A. UMTS. HSPA. GSM. GPRS. EDGE. 1×RTT. CDMA2000, 802.11 WiFi. HDMI. USB. Firewire, etc., or any other current or future protocols that can be utilized in conjunction with radio transceiver 1440, user interface 1450, and/or control interface 1460.

As another example, processor 1410 can execute program code stored in program memory 1420 that corresponds to MAC, RLC, PDCP, and RRC layer protocols standardized by 3GPP (e.g., for NR and/or LTE). As a further example, processor 1410 can execute program code stored in program memory 1420 that, together with radio transceiver 1440, implements corresponding PHY layer protocols, such as Orthogonal Frequency Division Multiplexing (OFDM). Orthogonal Frequency Division Multiple Access (OFDMA), and Single-Carrier Frequency Division Multiple Access (SC-FDMA). As another example, processor 1410 can execute program code stored in program memory 1420 that, together with radio transceiver 1440, implements device-to-device (D2D) communications with other compatible devices and/or UEs.

Program memory 1420 can also include software code executed by processor 1410 to control the functions of UE 1400, including configuring and controlling various components such as radio transceiver 1440, user interface 1450, and/or control interface 1460. Program memory 1420 can also comprise one or more application programs and/or modules comprising computer-executable instructions embodying any of the exemplary methods described herein. Such software code can be specified or written using any known or future developed programming language, such as e.g., Java. C++, C, Objective C, HTML, XHTML, machine code, and Assembler, so long as the desired functionality (e.g., as defined by the implemented method or procedure operations) is preserved. In addition, or as an alternative, program memory 1420 can comprise an external storage arrangement (not shown) remote from UE 1400, from which the instructions can be downloaded into program memory 1420 located within or removably coupled to UE 1400, so as to enable execution of such instructions.

Data memory 1430 can include memory area for processor 1410 to store variables used in protocols, configuration, control, and other functions of UE 1400, including operations corresponding to, or comprising, any of the exemplary methods described herein. Moreover, program memory 1420) and/or data memory 1430 can include non-volatile memory (e.g., flash memory), volatile memory (e.g., static or dynamic RAM), or a combination thereof. Furthermore, data memory 1430 can comprise a memory slot by which removable memory cards in one or more formats (e.g., SD Card, Memory Stick, Compact Flash, etc.) can be inserted and removed.

Persons of ordinary skill will recognize that processor 1410 can include multiple individual processors (including. e.g., multi-core processors), each of which implements a portion of the functionality described above. In such cases, multiple individual processors can be commonly connected to program memory 1420 and data memory 1430 or individually connected to multiple individual program memories and or data memories. More generally, persons of ordinary skill in the art will recognize that various protocols and other functions of UE 1400 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1440) can include radio-frequency transmitter and/or receiver functionality that facilitates the UE 1400 to communicate with other equipment supporting like wireless communication standards and/or protocols. In some embodiments, the radio transceiver 1440) includes one or more transmitters and one or more receivers that enable UE 1400 to communicate according to various protocols and/or methods proposed for standardization by 3GPP and/or other standards-setting organizations (SSOs). For example, such functionality can operate cooperatively with processor 1410 to implement a PHY layer based on OFDM, OFDMA, and/or SC-FDMA technologies, such as described herein with respect to other figures.

In some embodiments, radio transceiver 1440) includes one or more transmitters and one or more receivers that can facilitate the UE 1400 to communicate with various LTE. LTE-Advanced (LTE-A), and/or NR networks according to standards promulgated by 3GPP. In some embodiments of the present disclosure, the radio transceiver 1440) includes circuitry, firmware, etc. necessary for the UE 1400 to communicate with various NR, NR-U, LTE, LTE-A, LTE-LAA, UMTS, and/or GSM/EDGE networks, also according to 3GPP standards. In some embodiments, radio transceiver 1440 can include circuitry supporting D2D communications between UE 1400 and other compatible devices.

In some embodiments, radio transceiver 1440 includes circuitry, firmware, etc. necessary for the UE 1400 to communicate with various CDMA2000 networks, according to 3GPP2 standards. In some embodiments, the radio transceiver 1440) can be capable of communicating using radio technologies that operate in unlicensed frequency bands, such as IEEE 802.11 WiFi that operates using frequencies in the regions of 2.4, 5.6, and/or 60 GHZ. In some embodiments, radio transceiver 1440 can include a transceiver that is capable of wired communication, such as by using IEEE 802.3 Ethernet technology. The functionality particular to each of these embodiments can be coupled with and/or controlled by other circuitry in the UE 1400, such as the processor 1410 executing program code stored in program memory 1420 in conjunction with, and/or supported by, data memory 1430.

User interface 1450) can take various forms depending on the particular embodiment of UE 1400, or can be absent from UE 1400 entirely. In some embodiments, user interface 1450) can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1400 can comprise a tablet computing device including a larger touchscreen display. In such embodiments, one or more of the mechanical features of the user interface 1450 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1400 can be a digital computing device, such as a laptop computer, desktop computer, workstation, etc. that comprises a mechanical keyboard that can be integrated, detached, or detachable depending on the specific embodiment. Such a digital computing device can also comprise a touch screen display. Many embodiments of the UE 1400) having a touch screen display can receive user inputs, such as inputs related to exemplary methods described herein or otherwise known to persons of ordinary skill.

In some embodiments. UE 1400 can include an orientation sensor, which can be used in various ways by features and functions of UE 1400. For example, the UE 1400 can use outputs of the orientation sensor to determine when a user has changed the physical orientation of the UE 1400's touch screen display. An indication signal from the orientation sensor can be available to any application program executing on the UE 1400, such that an application program can change the orientation of a screen display (e.g., from portrait to landscape) automatically when the indication signal indicates an approximate 90-degree Change in physical orientation of the device. In this exemplary manner, the application program can maintain the screen display in a manner that is readable by the user, regardless of the physical orientation of the device. In addition, the output of the orientation sensor can be used in conjunction with various embodiments of the present disclosure.

A control interface 1460 of the UE 1400 can take various forms depending on the particular embodiment of UE 1400 and of the particular interface requirements of other devices that the UE 1400 is intended to communicate with and/or control. For example, the control interface 1460) can comprise an RS-232 interface, a USB interface, an HDMI interface, a Bluetooth interface, an IEEE ("Firewire") interface, an I²C interface, a PCMCIA interface, or the like. In some embodiments of the present disclosure, control interface 1460 can comprise an IEEE 802.3 Ethernet interface such as described above. In some embodiments of the present disclosure, the control interface 1460 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1400 can comprise more functionality than is shown in FIG. 14 including, for example, a video and/or still-image camera, microphone, media player and/or recorder, etc. Moreover, radio transceiver 1440) can include circuitry necessary to communicate using additional radio-frequency communication standards including Bluetooth, GPS, and/or others. Moreover, the processor 1410 can execute software code stored in the program memory 1420 to control such additional functionality. For example, directional velocity and/or position estimates output from a GPS receiver can be available to any application program executing on the UE 1400, including any program code corresponding to and/or embodying any embodiments (e.g., of methods) described herein.

Figure 15:
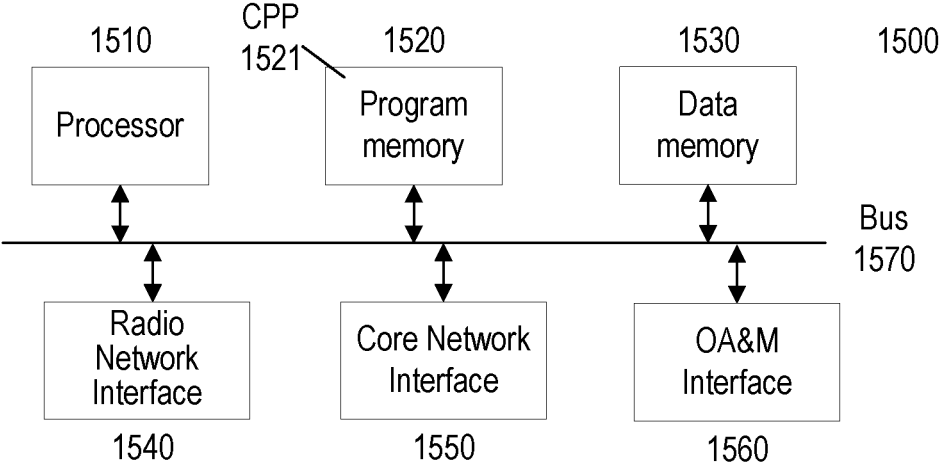
FIG. 15 is a block diagram of an exemplary network node according to various embodiments of the present disclosure.

FIG. 15 shows a block diagram of an exemplary network node 1500 according to various embodiments of the present disclosure, including those described above with reference to other figures. For example, exemplary network node 1500 can be configured by execution of instructions, stored on a computer-readable medium, to perform operations corresponding to one or more of the exemplary methods described herein. In some embodiments, network node 1500 can comprise a base station, eNB, gNB, or one or more components thereof. For example, network node 1500 can be configured as a central unit (CU) and one or more distributed units (DUs) according to NR gNB architectures specified by 3GPP. More generally, the functionally of network node 1500 can be distributed across various physical devices and/or functional units, modules, etc.

Network node 1500 can include processor 1510 (also referred to as "processing circuitry") that is operably connected to program memory 1520 and data memory 1530 via bus 1570, which can include parallel address and data buses, serial ports, or other methods and/or structures known to those of ordinary skill in the art.

Program memory 1520) can store software code, programs, and/or instructions (collectively shown as computer program product (CPP) 1521 in FIG. 15) that, when executed by processor 1510, can configure and/or facilitate network node 1500 to perform various operations, including operations corresponding to various exemplary methods described herein. As part of and/or in addition to such operations, program memory 1520 can also include software code executed by processor 1510 that can configure and/or facilitate network node 1500 to communicate with one or more other UEs or network nodes using other protocols or protocol layers, such as one or more of the PHY, MAC, RLC, PDCP, and RRC layer protocols standardized by 3GPP for LTE. LTE-A, and/or NR, or any other higher-layer (e.g., NAS) protocols utilized in conjunction with radio network interface 1540) and/or core network interface 1550. By way of example, core network interface 1550 can comprise the SI or NG interface and radio network interface 1540 can comprise the Uu interface, as standardized by 3GPP. Program memory 1520 can also comprise software code executed by processor 1510 to control the functions of network node 1500, including configuring and controlling various components such as radio network interface 1540 and core network interface 1550.

Data memory 1530 can comprise memory area for processor 1510 to store variables used in protocols, configuration, control, and other functions of network node 1500. As such, program memory 1520 and data memory 1530 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1510 can include multiple individual processors (not shown), each of which implements a portion of the functionality described above. In such case, multiple individual processors may be commonly connected to program memory 1520 and data memory 1530 or individually connected to multiple individual program memories and/or data memories. More generally, persons of ordinary skill will recognize that various protocols and other functions of network node 1500 may be implemented in many different combinations of hardware and software including, but not limited to, application processors, signal processors, general-purpose processors, multi-core processors. ASICs, fixed digital circuitry, programmable digital circuitry, analog baseband circuitry, radio-frequency circuitry, software, firmware, and middleware.

Radio network interface 1540 can comprise transmitters, receivers, signal processors. ASICs, antennas, beamforming units, and other circuitry that enables network node 1500 to communicate with other equipment such as, in some embodiments, a plurality of compatible user equipment (UE). In some embodiments, interface 1540) can also enable network node 1500 to communicate with compatible satellites of a satellite communication network. In some embodiments, radio network interface 1540) can comprise various protocols or protocol layers, such as the PHY, MAC, RLC, PDCP, and/or RRC layer protocols standardized by 3GPP for LTE. LTE-A, LTE-LAA, NR, NR-U, etc.: improvements thereto such as described herein above: or any other higher-layer protocols utilized in conjunction with radio network interface 1540. According to further embodiments of the present disclosure, the radio network interface 1540) can comprise a PHY layer based on OFDM. OFDMA, and/or SC-FDMA technologies. In some embodiments, the functionality of such a PHY layer can be provided cooperatively by radio network interface 1540 and processor 1510 (including program code in memory 1520).

Core network interface 1550) can comprise transmitters, receivers, and other circuitry that enables network node 1500 to communicate with other equipment in a core network such as, in some embodiments, circuit-switched (CS) and/or packet-switched Core (PS) networks. In some embodiments, core network interface 1550) can comprise the SI interface standardized by 3GPP. In some embodiments, core network interface 1550) can comprise the NG interface standardized by 3GPP. In some embodiments, core network interface 1550) can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1550 can comprise one or more of asynchronous transfer mode (ATM). Internet Protocol (IP)-over-Ethernet. SDH over optical fiber. T1/E1/PDH over a copper wire, microwave radio, or other wired or wireless transmission technologies known to those of ordinary skill in the art.

In some embodiments, network node 1500) can include hardware and/or software that configures and/or facilitates network node 1500 to communicate with other network nodes in a RAN (also referred to as a "wireless network"), such as with other eNBs, gNBs, ng-eNBs, en-gNBs. IAB nodes, etc. Such hardware and/or software can be part of radio network interface 1540) and/or core network interface 1550, or it can be a separate functional unit (not shown). For example, such hardware and/or software can configure and/or facilitate network node 1500 to communicate with other RAN nodes via the X2 or Xn interfaces, as standardized by 3GPP.

OA&M interface 1560 can comprise transmitters, receivers, and other circuitry that enables network node 1500 to communicate with external networks, computers, databases, and the like for purposes of operations, administration, and maintenance of network node 1500 or other network equipment operably connected thereto. Lower layers of OA&M interface 1560 can comprise one or more of asynchronous transfer mode (ATM). Internet Protocol (IP)-over-Ethernet. SDH over optical fiber. T1/E1/PDH over a copper wire, microwave radio, or other wired or wireless transmission technologies known to those of ordinary skill in the art. Moreover, in some embodiments, one or more of radio network interface 1540, core network interface 1550, and OA&M interface 1560 may be multiplexed together on a single physical interface, such as the examples listed above.

Figure 16:
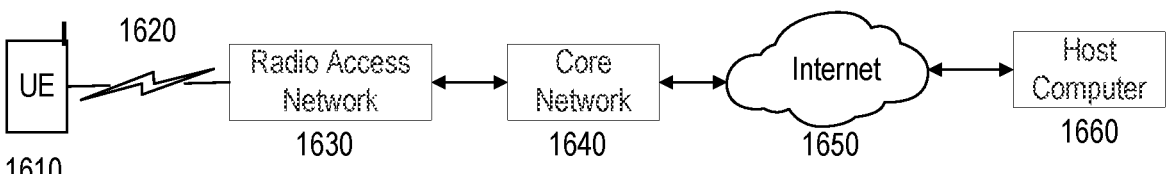
FIG. 16 is a block diagram of an exemplary communication network configured to provide over-the-top (OTT) data services between a host computer and a UE, according to various embodiments of the present disclosure.

FIG. 16 is a block diagram of an exemplary communication network configured to provide over-the-top (OTT) data services between a host computer and a user equipment (UE), according to various embodiments of the present disclosure. UE 1610 can communicate with radio access network (RAN, also referred to as "wireless network") 1630 over radio interface 1620, which can be based on protocols described above including, e.g., LTE, LTE-A, and 5G/NR. For example, UE 1610 can be configured and/or arranged as shown in other figures discussed above.

RAN 1630 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1630 can cooperatively operate using licensed and unlicensed spectrum. In some embodiments, RAN 1630 can include, or be capable of communication with, one or more satellites comprising a satellite access network.

RAN 1630 can further communicate with core network 1640 according to various protocols and interfaces described above. For example, one or more apparatus (e.g., base stations, eNBs, gNBs, etc.) comprising RAN 1630 can communicate to core network 1640 via core network interface 1650 described above. In some embodiments, RAN 1630 and core network 1640 can be configured and/or arranged as shown in other figures discussed above. For example, eNBs comprising an E-UTRAN 1630 can communicate with an EPC core network 1640 via an SI interface. As another example, gNBs and ng-eNBs comprising an NG-RAN 1630 can communicate with a 5GC core network 1630 via an NG interface.

Core network 1640 can further communicate with an external packet data network, illustrated in FIG. 16 as Internet 1650, according to various protocols and interfaces known to persons of ordinary skill in the art. Many other devices and/or networks can also connect to and communicate via Internet 1650, such as exemplary host computer 1660. In some embodiments, host computer 1660 can communicate with UE 1610 using Internet 1650, core network 1640, and RAN 1630 as intermediaries. Host computer 1660 can be a server (e.g., an application server) under ownership and/or control of a service provider. Host computer 1660 can be operated by the OTT service provider or by another entity on the service provider's behalf.

For example, host computer 1660 can provide an over-the-top (OTT) packet data service to UE 1610 using facilities of core network 1640 and RAN 1630, which can be unaware of the routing of an outgoing/incoming communication to/from host computer 1660. Similarly, host computer 1660 can be unaware of routing of a transmission from the host computer to the UE, e.g., the routing of the transmission through RAN 1630. Various OTT services can be provided using the exemplary configuration shown in FIG. 16 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 16 can also include measurement procedures and/or sensors that monitor network performance metrics including data rate, latency and other factors that are improved by embodiments disclosed herein. The exemplary network can also include functionality for reconfiguring the link between the endpoints (e.g., host computer and UE) in response to variations in the measurement results. Such procedures and functionalities are known and practiced: if the network hides or abstracts the radio interface from the OTT service provider, measurements can be facilitated by proprietary signaling between the UE and the host computer.

Embodiments described herein can facilitate broad UE adoption and/or implementation of SI hash reporting, which is desirable to combat false base stations and other network security risks. In this manner, embodiments can facilitate improved network security due to reporting of SI hash information from many UEs that adopt and/or implement them. When used in NR UEs (e.g., UE 1610) and gNBs (e.g., gNBs comprising RAN 1630), embodiments can improve network security and reduce service interruptions, e.g., due to denial of service attacks by a false base station. Consequently, this improves the performance of services as experienced by OTT service providers and end-users, including more precise delivery of services with lower latency and fewer interruptions or other reductions in user experience. This increases the value of OTT services to both end users and service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM). Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset: this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a user equipment (UE) operating in a wireless network, the method comprising:

obtaining system information (SI) broadcast in each of a plurality of cells in the wireless network that are visited by the UE;

for each of the visited cells, determining one or more SI hash values for the SI broadcast in the visited cell; and sending, to a network node in the wireless network, at least a portion of the determined SI hash values as mobility history information (MHI).

A2. The method of embodiment A1, wherein the MHI includes, for each visited cell: an identifier of the visited cell;

a duration of time spent by the UE in the visited cell; and zero or more SI hash values associated with the visited cell, wherein the MHI includes at least one SI hash value for one or more of the visited cells.

A3. The method of embodiment A2, wherein the MHI includes, for each visited cell, a single hash value for all SI broadcast in the visited cell.

A4. The method of embodiment A2, wherein the MHI includes, for each visited cell, a plurality of SI hash values that are associated with respective non-overlapping subsets of the SI broadcast in the visited cell.

A5. The method of embodiment A4, wherein:

the SI broadcast in each visited cell includes a master information block (MIB) and a plurality of SI blocks (SIBs);

the respective SI hash values, included in the MHI for the visited cell, are associated with respective ones of the MIB and SIBs.

A6. The method of embodiment A5, wherein:

the MHI includes, for each visited cell, a bitmap comprising a plurality of bits associated with the respective ones of the MIB and SIBs; and the respective values of the bits in the bitmap indicate whether the MHI includes an SI hash value for the respective ones of the MIB and SIBs.

A7. The method of embodiment A5, wherein the MHI includes, for each SI hash value for each visited cell, an identifier of one of the MIB and SIBs associated with the SI hash value.

A8. The method of any of embodiments A2-A7, wherein the MHI also includes an indication of a hash algorithm used by the UE to determine the SI hash values.

A9. The method of any of embodiments A1-A8, further comprising receiving, from the network node, a first indication of whether the UE should report available SI hash values.

A10. The method of embodiment A9, wherein the MHI is sent to the network node in response to the first indication indicating that the UE should report available SI hash values.

A11. The method of any of embodiments A9-A10, wherein the first indication is received as broadcast SI.

A12. The method of any of embodiments A9-A10, further comprising sending, to the network node, a second indication that SI hash values are available to be reported as MHI, wherein the first indication is received as a request for UE information responsive to the second indication.

A13. The method of any of embodiments A9-A12, wherein when the first indication indicates that the UE should report available SI hash values, the first indication is received together with further indications of one of the following:

a maximum number of SI hash values to report;

a maximum total size of SI hash values to report;

one or more subsets of broadcast SI for which the UE should report SI hash values; and a hash algorithm to be used for determining SI hash values to be reported.

A14. The method of embodiment A13, wherein determining the one or more SI hash values further comprises:

storing the obtained SI; and after receiving the further indication of the hash algorithm, determining the one or more SI hash values based on the indicated hash algorithm.

A15. The method of any of embodiments A1-A14, further comprising selecting a signaling radio bearer (SRB) for reporting the SI hash values based on the total size of SI hash values to be reported.

A16. The method of any of embodiments A1-A15, further comprising selecting a subset of the determined SI hash values for reporting to the wireless network, based on one or more of the following criteria:

randomly, maximum and/or minimum numbers of SI hashes per visited cell, respective sizes of the determined SI hashes, and chronological order in which the plurality of cells were visited by the UE.

B1. A method for a network node of a wireless network, the method comprising:

receiving, from a user equipment (UE) as mobility history information (MHI), one or more system information (SI) hash values for SI broadcast in one or more cells of the wireless network that were visited by the UE.

B2. The method of embodiment B1, wherein the MHI includes, for each visited cell:

an identifier of the visited cell;

a duration of time spent by the UE in the visited cell; and zero or more SI hash values associated with the visited cell, wherein the MHI includes at least one SI hash value for one or more of the visited cells.

B3. The method of embodiment B2, wherein the MHI includes, for each visited cell, a single hash value for all SI broadcast in the visited cell.

B4. The method of embodiment B2, wherein the MHI includes, for each visited cell, a plurality of SI hash values that are associated with respective non-overlapping subsets of the SI broadcast in the visited cell.

B5. The method of embodiment B4, wherein:

the SI broadcast in each visited cell includes a master information block (MIB) and a plurality of SI blocks (SIBs);

the respective SI hash values, included in the MHI for the visited cell, are associated with respective ones of the MIB and SIBs.

B6. The method of embodiment B5, wherein:

the MHI includes, for each visited cell, a bitmap comprising a plurality of bits associated with the respective ones of the MIB and SIBs; and the respective values of the bits in the bitmap indicates whether the MHI includes an SI hash value for the respective ones of the MIB and SIBs.

B7. The method of embodiment B5, wherein the MHI includes, for each SI hash value for each visited cell, an identifier of one of the MIB and SIBs associated with the SI hash value.

B8. The method of any of embodiments B2-B7, wherein the MHI also includes an indication of a hash algorithm used by the UE to determine the SI hash values.

B9. The method of any of embodiments B1-B8, further comprising transmitting a first indication of whether the UE should report available SI hash values.

B10. The method of embodiment B9, wherein the MHI is received from the UE in response to the first indication indicating that the UE should report available SI hash values.

B11. The method of any of embodiments B9-B10, wherein the first indication is transmitted as broadcast SI, indicating whether all UEs receiving the first indication should report SI hash values.

B12. The method of any of embodiments B9-B10, further comprising receiving, from the UE, a second indication that SI hash values are available to be reported by the UE as MHI, wherein the first indication is transmitted as a request for UE information responsive to the second indication.

B13. The method of any of embodiments B9-B12, wherein when the first indication indicates that the UE should report available SI hash values, the first indication is transmitted together with further indications of one of the following:

a maximum number of SI hash values to report;

a maximum total size of SI hash values to report;

one or more subsets of broadcast SI for which the UE should report SI hash values; and a hash algorithm to be used for determining SI hash values to be reported.

B14. The method of any of embodiments B1-B13, wherein the MHI, including the SI hash values, is received on particular one of a plurality of available signaling radio bearers (SRBs), the particular SRB being dependent on the total size of received SI hash values.

B15. The method of any of embodiments B1-B14, wherein the received SI hash values are a subset of all SI hash values available from the UE, the subset being based on one or more of the following criteria:

random selection, maximum and/or minimum numbers of SI hashes per visited cell, respective sizes of the determined SI hashes, and chronological order in which the plurality of cells were visited by the UE.

B16. The method of any of embodiments B1-B15, further comprising:

obtaining, from one or more network nodes serving the one or more cells, SI hash values corresponding to the SI hash values received from the UE;

comparing the SI hash values received from the UE to the respective corresponding SI hash values; and when an SI hash value does not match a corresponding SI hash values, detecting a network security problem associated with a network node that broadcasts the SI associated with the non-matching SI hash values.

C1. A user equipment (UE) configured for operation in a wireless network, the UE comprising:

radio transceiver circuitry configured to communicate with the wireless network via a plurality of cells; and processing circuitry operatively coupled to the radio transceiver circuitry, whereby the processing circuitry and the radio transceiver circuitry are configured to perform operations corresponding to any of the methods of embodiments A1-A15.

C2. A user equipment (UE) configured for operation in a wireless network, the UE being further configured to perform operations corresponding to any of the methods of embodiments A1-A15.

C2. A non-transitory, computer-readable medium storing computer-executable instructions that, when executed by processing circuitry of a user equipment (UE) configured for operation in a wireless network, configure the UE to perform operations corresponding to any of the methods of embodiments A1-A15.

C4. A computer program product comprising computer-executable instructions that, when executed by processing circuitry of a user equipment (UE) configured for operation in a wireless network, configure the UE to perform operations corresponding to any of the methods of embodiments A1-A15.

D1. A network node configured for operation in a wireless network, the network node comprising:

a communication interface configured to communicate with user equipment (UE) and with one or more further nodes in the wireless network; and processing circuitry operatively coupled to the communication interface, whereby the processing circuitry and the communication interface are configured to perform operations corresponding to any of the methods of embodiments B1-B16.

D2. A network node configured for operation in a wireless network, the network node being further configured to perform operations corresponding to any of the methods of embodiments B1-B16.

D3. A non-transitory, computer-readable medium storing computer-executable instructions that, when executed by processing circuitry of a network node configured for operation in a wireless network, configure the network node to perform operations corresponding to any of the methods of embodiments B1-B16.

D4. A computer program product comprising computer-executable instructions that, when executed by processing circuitry of a network node configured for operation in a wireless network, configure the network node to perform operations corresponding to any of the methods of embodiments B1-B16.

The invention claimed is:

1. A method for a user equipment (UE) configured to operate in a wireless network, the method comprising:

while operating in a non-connected state in the wireless network, obtaining system information (SI) broadcast in each of a plurality of cells visited by the UE;

for each of the visited cells, determining one or more SI hash values for the SI broadcast in the visited cell; and sending, to a network node in the wireless network, at least a portion of the determined SI hash values as mobility history information (MHI), wherein one of the following applies:

the MHI includes, for each of the visited cell, a single SI hash value for all SI broadcast in the visited cell; or the MHI includes, for each of the visited cell, a plurality of SI hash values that are associated with respective non-overlapping subsets of the SI broadcast in the visited cell.

2. The method of claim 1, wherein the MHI also includes, for each of the visited cell:

an identifier of the visited cell; and a duration of time spent by the UE in the visited cell.

3. The method of claim 1, wherein the MHI also includes an indication of a hash algorithm used by the UE to determine the one or more SI hash values for each of the visited cell.

4. The method of claim 1, further comprising receiving, from the network node, a first indication of whether the UE should report available SI hash values, wherein the MHI is sent to the network node in response to the first indication indicating that the UE should report the available SI hash values.

5. The method of claim 4, wherein one of the following applies:

the first indication is received as broadcast SI; or the method further comprises sending, to the network node, a second indication that the SI hash values are available to be reported as MHI, wherein the first indication is received as a request for UE information responsive to the second indication.

6. The method of claim 4, wherein when the first indication indicates that the UE should report the available SI hash values, the first indication is received together with further indications of one of the following:

a maximum number of the available SI hash values to report;

a maximum total size of the available SI hash values to report;

one or more subsets of broadcast SI for which the UE should report the available SI hash values; and a hash algorithm to be used for determining the available SI hash values to be reported.

7. The method of claim 6, wherein determining the one or more SI hash values further comprises:

storing the obtained SI; and after receiving the further indication of the hash algorithm, determining the one or more SI hash values based on the indicated hash algorithm.

8. The method of claim 1, further comprising selecting a signaling radio bearer (SRB) for sending the at least a portion of the determined SI hash values to the network node, based on a total size of the SI hash values being sent.

9. A method for a network node configured to operate in a wireless network, the method comprising:

receiving, from a user equipment (UE) as mobility history information (MHI), one or more system information (SI) hash values for SI broadcast in one or more cells visited by the UE while the UE was operating in a non-connected state in the wireless network, wherein one of the following applies:

the MHI includes, for each of the one or more visited cells, a single SI hash value for all SI broadcast in the visited cell; or the MHI includes, for each of the visited cell, a plurality of SI hash values that are associated with respective non-overlapping subsets of the SI broadcast in the visited cell.

10. The method of claim 9, wherein the MHI also includes, for each of the visited cell:

an identifier of the visited cell; and a duration of time spent by the UE in the visited cell.

11. The method of claim 9, further comprising transmitting a first indication of whether the UE should report available SI hash values, wherein the MHI is received from the UE in response to the first indication indicating that the UE should report the available SI hash values.

12. The method of claim 9, further comprising:

obtaining, from one or more network nodes serving the one or more cells, SI hash values corresponding to the SI hash values received from the UE;

comparing the SI hash values received from the UE to the respective corresponding SI hash values; and when an SI hash value does not match a corresponding SI hash value, detecting a network security problem associated with a network node that broadcasts the SI associated with the non-matching SI hash values.

13. A user equipment (UE) configured to operate in a wireless network, the UE comprising:

radio transceiver circuitry configured to communicate with the wireless network via a plurality of cells; and processing circuitry operatively coupled to the radio transceiver circuitry, whereby the processing circuitry and the radio transceiver circuitry are configured to:

while operating in a non-connected state in the wireless network, obtain system information (SI) broadcast in each of a plurality of cells visited by the UE;

for each of the visited cells, determine one or more SI hash values for the SI broadcast in the visited cell; and send, to a network node in the wireless network, at least a portion of the determined SI hash values as mobility history information (MHI), wherein one of the following applies:

the MHI includes, for each of the visited cell, a single SI hash value for all SI broadcast in the visited cell; or the MHI includes, for each of the visited cell, a plurality of SI hash values that are associated with respective non-overlapping subsets of the SI broadcast in the visited cell.

14. The UE of claim 13, wherein the MHI also includes, for each of the visited cell:

an identifier of the visited cell; and a duration of time spent by the UE in the visited cell.

15. The UE of claim 13, wherein the MHI also includes an indication of a hash algorithm used by the UE to determine the one or more SI hash values for each of the visited cell.

16. The method of claim 13, wherein the processing circuitry and the radio transceiver circuitry are further configured to receive, from the network node, a first indication that the UE should report available SI hash values, wherein:

the MHI is sent to the network node in response to the first indication; and

one of the following applies:
    the first indication is received as broadcast SI; or
    the processing circuitry and the radio transceiver cir-
        cuitry are further configured to send, to the network
        node, a second indication that the SI hash values are
        available to be reported as MHI, wherein the first
        indication is received as a request for UE informa-
        tion responsive to the second indication.
17. A network node configured to operate in a wireless
network, the network node comprising:
    a communication interface configured to communicate
        with user equipment (UEs) and with one or more
        further nodes in the wireless network; and
    processing circuitry operatively coupled to the commu-
        nication interface, whereby the processing circuitry and
        the communication interface are configured to perform
        operations corresponding to the method of claim 9.

* * * * *

34